(12) United States Patent
Lamont et al.

(10) Patent No.: US 11,579,601 B2
(45) Date of Patent: Feb. 14, 2023

(54) METHODS AND DEVICES FOR A BUILDING MONITORING SYSTEM

(71) Applicant: Pricemy Developer LLC, Tempe, AZ (US)

(72) Inventors: John Lamont, Tempe, AZ (US); Leslie Nielson, Waddell, AZ (US); Robert Pescatore, Chandler, AZ (US)

( * ) Notice: Subject to any disclaimer, the term of this patent is extended or adjusted under 35 U.S.C. 154(b) by 141 days.

(21) Appl. No.: 16/743,552

(22) Filed: Jan. 15, 2020

(65) Prior Publication Data

US 2020/0225653 A1 Jul. 16, 2020

Related U.S. Application Data

(60) Provisional application No. 62/792,713, filed on Jan. 15, 2019.

(51) Int. Cl.
| | |
|---|---|
| *G05B 23/02* | (2006.01) |
| *G05D 7/06* | (2006.01) |
| *G01N 27/02* | (2006.01) |
| *F24F 11/36* | (2018.01) |
| *F24F 11/58* | (2018.01) |
| *F24F 11/52* | (2018.01) |

(52) U.S. Cl.
CPC .......... *G05B 23/0272* (2013.01); *F24F 11/36* (2018.01); *F24F 11/52* (2018.01); *F24F 11/58* (2018.01); *G01N 27/02* (2013.01); *G05D 7/0635* (2013.01)

(58) Field of Classification Search
CPC ............ G05B 23/0272; G05B 23/0267; G05D 7/0635; F24F 11/52; F24F 11/36; F24F 11/58; F24F 2140/00; G01N 27/02
See application file for complete search history.

(56) References Cited

U.S. PATENT DOCUMENTS

| | | | | |
|---|---|---|---|---|
| 8,922,379 | B1* | 12/2014 | Meyer | G08B 21/20 340/605 |
| 2004/0206405 | A1* | 10/2004 | Smith | E03C 1/00 137/624.12 |
| 2006/0191324 | A1* | 8/2006 | Garabedian | G08B 21/12 73/40 |

(Continued)

*Primary Examiner* — Charles R Kasenge
(74) *Attorney, Agent, or Firm* — Accelerate IP LLC

(57) ABSTRACT

A building monitoring system, wherein the system comprises an HVAC monitor, which comprised a condensing unit connector, an air handler connector, a thermostat connector and a control module, a wetness detector; and a communicator. The communicator accesses a location of the building monitoring system and selectively communicates with a technician based at least in part on the location. A monitor system for use with an existing HVAC unit, wherein the HVAC unit has a condenser or furnace, an air handler, and a thermostat, the HVAC monitor system comprising at least one condenser or furnace sensor, at least one air handler sensor and at least one control module. A wetness monitor system, comprising at least one wetness detector connected to a control, wherein the control is also connected to a network and the network is connected to a flow shutoff valve. A method of monitoring a location for wetness comprising detecting wetness through at least one wetness detector, monitoring the state of a shutoff valve.

5 Claims, 21 Drawing Sheets

(56) References Cited

U.S. PATENT DOCUMENTS

| | | | | |
|---|---|---|---|---|
| 2012/0026004 A1* | 2/2012 | Broniak | ................ | E03B 7/075 |
| | | | | 73/40.5 R |
| 2012/0180877 A1* | 7/2012 | Pallais | ................ | G01M 3/002 |
| | | | | 137/487.5 |
| 2012/0245878 A1* | 9/2012 | Kane | ................ | G05B 15/02 |
| | | | | 702/116 |
| 2013/0009775 A1* | 1/2013 | Egawa | ................ | H04L 29/12254 |
| | | | | 340/540 |
| 2014/0262130 A1* | 9/2014 | Yenni | ................ | F24F 11/30 |
| | | | | 165/11.1 |
| 2014/0306828 A1* | 10/2014 | Trescott | ................ | G01M 3/2807 |
| | | | | 340/605 |
| 2014/0348205 A1* | 11/2014 | Shaw | ................ | G01M 3/002 |
| | | | | 374/142 |
| 2016/0090717 A1* | 3/2016 | Trescott | ................ | G01K 13/02 |
| | | | | 137/551 |
| 2016/0298317 A1* | 10/2016 | Trescott | ................ | E03B 7/072 |
| 2017/0076263 A1* | 3/2017 | Bentz | ................ | G06F 3/0481 |
| 2017/0138022 A1* | 5/2017 | Trescott | ................ | E03B 7/071 |
| 2017/0292725 A1* | 10/2017 | Conley | ................ | G05B 19/048 |
| 2018/0066975 A1* | 3/2018 | Viswanathan | ................ | G01F 25/20 |
| 2019/0072291 A1* | 3/2019 | Kamijo | ................ | F25B 49/005 |
| 2019/0170383 A1* | 6/2019 | Weinert | ................ | F24F 11/79 |
| 2019/0170603 A1* | 6/2019 | Gupte | ................ | G01M 3/24 |
| 2019/0234786 A1* | 8/2019 | Klicpera | ................ | G01F 15/063 |
| 2019/0281371 A1* | 9/2019 | Klicpera | ................ | H04L 12/2827 |
| 2019/0331377 A1* | 10/2019 | Matsuda | ................ | F25B 49/005 |
| 2020/0248919 A1* | 8/2020 | Green | ................ | G05B 23/027 |

* cited by examiner

| Sensor Type | Description |
|---|---|
| Amp | Compressor Capacitor Monitor |
| Amp | Outdoor Fan Monitor |
| Amp | Fan Motor Monitor |
| Amp | Compressor Monitor |
| Pressure | Liquid Line Pressure |
| Temp | Liquid Line Temperature |
| Pressure | Suction Line Pressure |
| Temp | Suction Line Temp |
| Temp | Ambient Temp Sensor |
| Temp | Return Air Temp Sensor |
| Temp | Supply Air Temp Sensor |
| Water Detection | Condensation over Flow Switch |
| Amp | Blower motor capacitor amp draw |
| Amp | Blower motor amp draw |
| Amp | Inducer motor Amp Draw |
| Amp | Inducer Motor Amp Draw |
| Temp | Capacitor Temp |
| Temp | One for each Capacitor |

*Fig. 8*

| Sensor Type | Description |
|---|---|
| Coil Water Detection | Under Kitchen Sink |
| Coil Water Detection | Next to Refrigerator |
| Coil Water Detection | Under Bathroom Sinks |
| Coil Water Detection | Toilets |
| Coil Water Detection | Water Heater |
| Coil Water Detection | Water Closet |
| Coil Water Detection | Sump Pump |

*Fig. 12*

METHODS AND DEVICES FOR A BUILDING MONITORING SYSTEM

CROSS-REFERENCE TO RELATED APPLICATIONS

This application claims benefit from U.S. Provisional Application No. 62/792,713 titled "Methods and Devices for a Building Monitoring System" and having a filing date of Jan. 15, 2019, all of which is incorporated by reference herein.

BACKGROUND OF THE INVENTION

Field of the Invention

The present invention relates to heating, ventilation, and air condition system ("HVAC") system, an active leak detection system and an active alert and monitoring system, and more particular an intelligent residence, or building that remotely monitors, provides diagnostics, and alerts a user or gives a technician real-time updates on the system allowing for an on-demand technician service model.

Description of Related Art

Various types of devices for creating an intelligent residence or building exist in the art, more particular for monitoring and controlling residential or commercial HVAC systems and plumbing systems, and then alerting a user of a problem. Current intelligent residence or buildings only monitor and alert the user on a limited amount of information being produced by the HVAC or plumbing systems. For example, current HVAC systems may have many environmental parameters, such as temperature, humidity, pressure, and currents. The user can control some of these environmental parameters from a thermostat that can be set to targeted values. The thermostat then sends electrical signals to a control module which controls a circular blower, also referred to as a fan, and other parts of the HVAC system. The thermostat can send electrical signals to the HVAC system's control center when the user requests heat or cold air. Certain HVAC systems known in the art can control and monitor these electrical signals and display the HVAC's status to a technician or user when they are next to the HVAC unit. This data can be collected and used to diagnose the HVAC system, and then report what is wrong with the system.

To keep an HVAC system operating at peak efficiency, home-owners and businesses are urged by the manufacturers to schedule regular maintenance on their HVAC system, which consists of changing all the filters, cleaning coils and heat transfer surfaces, checking coolant levels and recharging, if necessary, and making sure there are no air flow obstructions within the system. There are several problems with regularly schedule maintenance that can cause both residential and business owners problems without knowing the root cause of the problem, a technician can sometimes spend hours if not days' troubleshooting the customer's HVAC system. For example, a problem may only appear when the refrigerant flows thru the condenser and triggers the float valve. If this occurs the technician is wasting valuable time driving to the residence, or commercial building to troubleshoot and repair the system. In addition, a maintenance call may not be necessary if the coolant levels are correct, air filters are clean, and the HVAC system is running within its standard ranges adding an extra expense for an unnecessary visit. Furthermore, a technician may miss a faulty part, or a part that is about ready to fail during the routine maintenance inspection which may end up costing the owner more in repeat visits.

To help mitigate these type of problems residential and business performance monitors where created to measure different systems within the residence or business. For example, most HVAC monitoring systems take the difference between the HVAC system's return (intake) air stream temperature and the supply (exhaust) air stream temperature to determine if there is something wrong with the system. These types of systems can only run diagnostics, give a user a limited amount information when a fault is detected, and usually are integrated within, or interfere with the system and cannot be bypassed. Furthermore, current HVAC monitoring systems can be controlled remotely through a user's computing device, but these type of systems are limited to controlling the temperature or air flow remotely, or the HVAC system comes with a monitoring system already incorporated into the condenser unit and air handler unit, which limits the user to very specific components being monitored within the system. A small percentage of building HVAC systems operate efficiently or with the intent of the designer, and can collect data and report on the diagnostics. Operational faults are one of the main reasons for inefficient performance, and by simply fixing these faults the HVAC system can be optimized to run efficiently. In addition, there is currently not a system that incorporates a HVAC monitoring system with an on-demand service for requesting a technician service if the HVAC monitoring systems gives an error. Therefore, automated systems for fault detection are essential to optimize the building HVAC's performance Wetness detection systems exist in the art. Water leaks are common problems around air conditioners, hot water heaters, washing machines, toilets, and various other water-dependent appliances used in residential and commercial buildings. While HVAC systems may not consist of water, it does however use refrigerant cooling, which still threatens homes and/or businesses if not properly drained. Water leaks are unpredictable and can happen at any time of the day and are detected only when a substantial amount of water has accumulated. This problem further is exacerbated by aging appliances and plumbing and deteriorating joints. Unpredictable and untimely water leaks are always inconvenient and can cause incidental damage to furniture, electrical equipment, flooring, and other property.

Obviously, it would be advantageous for practitioners in the art to have the benefit of a permanent, early-warning alarm system for detecting these common wetness leaks before costly repairs become necessary. However, developments in the art only address monitoring and detecting leaks throughout a residence and business in usually one area with audible alarms. For example, Doumit discloses, in U.S. Pat. No. 6,526,807, a centrally located control apparatus that electrically inter connects a plurality of circuits that can detect water leaks throughout a residential or commercial building with the circuitry acting as the probes for detecting water leaks, which allow the location and extent of the leak to be ascertained when wetness is detected. Typical of prior art, the Doumit detection only detects and alerts the home or business owner, but does not actively stop or contain the leak from spreading once the owner is alerted.

Accordingly, these limitations, and disadvantages of the prior art are overcome with the present invention, and improved means and techniques for monitoring and diagnosing a residential or building's systems, more particular a building's HVAC and plumbing system that provides a dynamic supply positioning for on-demand technician and repair services along with a data analysis system. In addition, advancements in the art allow a user to monitor a residential or commercial building in real-time, receive alerts, and send a technician that are in close proximity to the residence or property.

SUMMARY OF THE INVENTION

Aspects disclosed herein relates to a building monitoring system. A building monitoring system can comprise a HVAC monitoring comprising a condensing unit connector, an air handler connector, a thermostat and a control module, a wetness detector, and a communicator, wherein the communicator accesses a location of a building monitoring system and selectively communicates with a technician based at least in part on the location. The HVAC monitor can comprise a monitoring center module, a condenser module attached to a condenser unit, and an air handler module attached to an air handler wherein the monitoring center module can be connected between the condenser module, thermostat, and the air handler module. The monitoring center module can further comprise a voltage sensor input, and a fault sensor input wherein the voltage sensor input can be connected to the HVAC systems main power wherein the voltage sensor input can detect power failure within the system. The HVAC monitor can comprise a monitoring center module. The monitoring center module can comprise a printed circuit board ("PCB") base material, and can further comprise one or more relay switches and at least one battery wherein the relay switches can correspond and connect to the typical naming terminals of the HVAC system.

The monitoring center module can further comprise one or more sensor comprising a voltage sensor input, and a fault sensor input wherein the voltage sensor input can be connected to the HVAC systems main power wherein the voltage sensor input can detect power failure within the system. The air handler module can comprise one or more sensors such as an air handler motor current transducer, one or more temperature sensors such as a return air temperature and a supply air temperature, a wetness detection sensor, and a flow meter wherein the air handler motor current transducer can measure the current delivered to the air handler unit from the electrical panel.

A user can select whether to contact the technician, or the technician can be selected based on the location or anticipated location of the technician. The technician can be selected further based on parts or tools available to the technician. The HVAC monitor and the wetness detector can create a fault notification, wherein the fault notification can have characteristics and wherein the technician is selected at least in part based on the characteristics of the fault notification. A method for monitoring a building having a steward which can comprise receiving operating information from a HVAC system and at least one wetness detector and detecting a fault status based on the information and creating a fault notification, communicating the fault notification to the steward, determining an appropriate technician to address the fault status based at least in part on the fault status and the location of the building; and selectively contacting the technician and requesting a response.

The technician can be selected based on an input from the steward, wherein a plurality of technicians can communicate to the steward and the technician can be selected from the plurality of technicians by building owner and/or steward. The technician is selected at least in part based on an evaluation of whether the technician is close proximity to the steward, or has parts or tools to address the fault. The method of monitoring a building can further comprising defining nominal operating conditions for the HVAC system and/or the wetness detector and defining the fault status as a condition outside of the nominal operating conditions. The method of monitoring a building can further comprise tracking a plurality of fault statuses and information related to the fault statuses.

The steward can receive a request for a technician based upon the geographical location point and/or geospatial scheduler from the building owner's given location wherein the monitoring center module can transmit the building's location. The steward can access the list of technicians in the geographical location and/or geospatial scheduler and store the technician's location comparing the customer's location point storing both in a cluster mapping table. The building's location can be transmitted to the technician. If a fault or system error is detected the fault or system error is analyzed with either the monitoring center module. The technicians that are in the area that can respond to the customer's service call and has a replacement part can be identified. The computer system can collect, store, and translate the data and send that information to the technician, or the user.

A monitor system for use with an existing HVAC unit, wherein the HVAC unit has a condenser or furnace, an air handler, and a thermostat, the HVAC monitor system comprising at least one condenser or furnace sensor, at least one air handler sensor and at least one control module connected to the sensors and the thermostat, wherein the control comprises a processor and wherein the processor detects the existence of a fault based on information from the sensors; and a transceiver to relay information from the control to a network, wherein the network can communicate a fault notification to a user, a bypass that allows the HVAC unit to bypass the monitor system to maintain operation of the HVAC unit in the event of failure of the monitor system.

A wetness monitor system, comprising at least one wetness detector connected to a control, wherein the control is also connected to a network and the network is connected to a flow shutoff valve; wherein the control senses whether the shutoff valve in an open state or a closed state, and wherein the network communicates a notification to a user based on the state of the shutoff valve and whether wetness is detected by the at least one wetness detector. The wetness detector can further comprise a wetness detection coil wherein the wetness detection coil is an induction coil. The wetness detector can comprise a housing, a wetness detection printed circuit board having a power switch, a micro-controller unit ("leak detection MCU") a wetness detection sensor, and a temperature sensor. The wetness detection sensor can be attached to or connected to the wetness detection PCB.

The wetness shutoff valve can be removably, attached to the building's main water supply. The wetness shutoff valve can replace or be placed inline next to the building's water main shutoff valve. The wetness shutoff valve can be electronic wherein an electric motor can turn the valve to the on and off positions, and the wetness shutoff valve can be connected to a wireless communication system wherein the user can have access the wetness shutoff valve remotely. A method of monitoring a location for wetness comprising detecting wetness through at least one wetness detector, monitoring the state of a shutoff valve to determine if the shutoff valve is in an open or a closed state, notifying a user of a change the at least one wetness detector or state of the shutoff valve, and allowing a steward to remotely close and/or open the shutoff valve. The user can determine the location of the wetness detector within a building through a computing device.

Additional features and advantages of the present specification will become apparent to those skilled in the art upon consideration of the following detailed description of the illustrative embodiment exemplifying the best mode of carrying out the invention as presently perceived.

BRIEF DESCRIPTION OF THE DRAWINGS

These and other features, aspects, and advantages of the present specification will become better understood with regard to the following description, appended claims, and accompanying drawings where:

FIG. 8 illustrates a non-exhaustive listing of sensor locations in air handler and condenser unit in accordance to one, or more embodiments;

FIG. 12 illustrates a non-exhaustive listing of a wetness detection locations in building in accordance to one, or more embodiments;

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Figure 1:
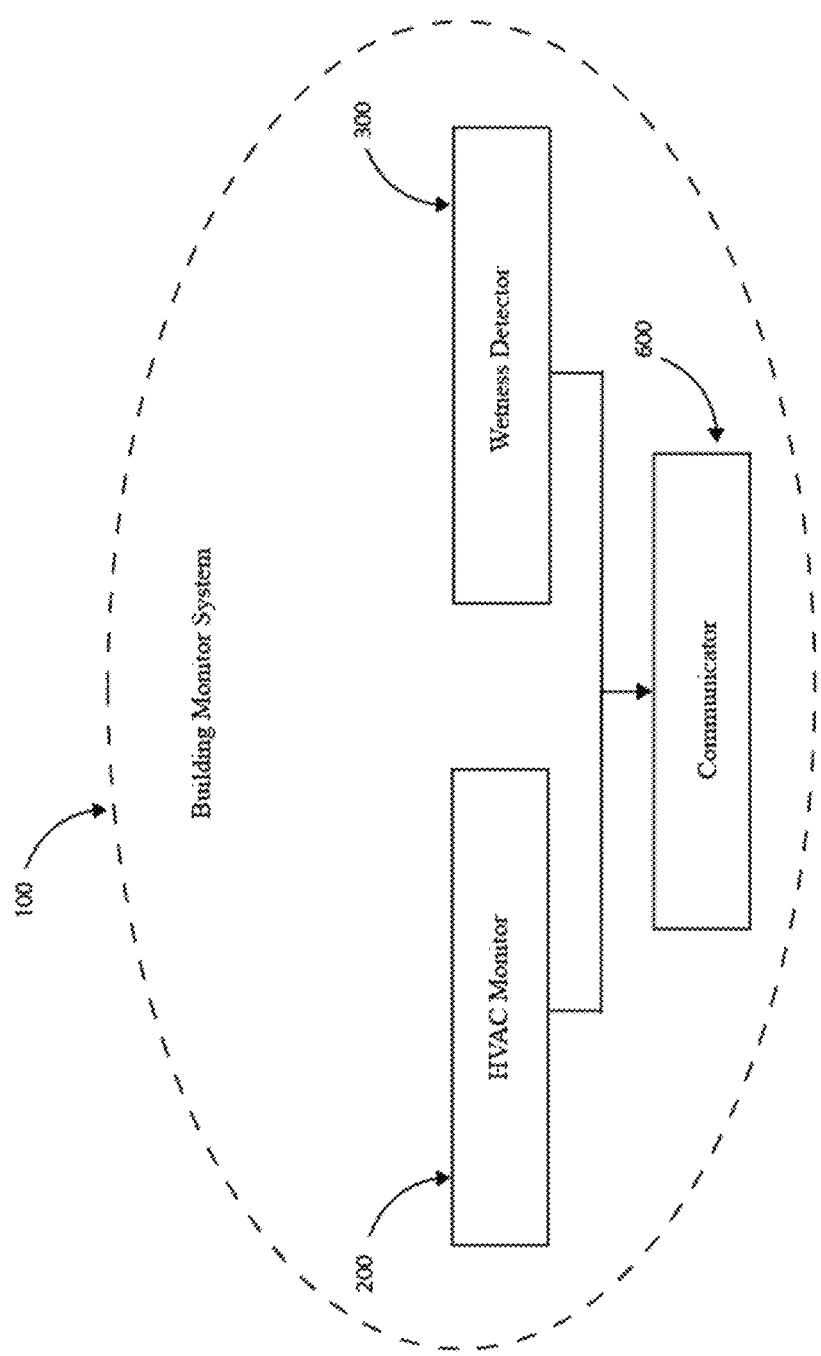
FIG. 1 illustrates a flow chart of an overall building monitoring system in accordance to one, or more embodiments.

FIG. 1 illustrates a general overview of a building monitoring system 100. In embodiments, a building monitoring system 100 can comprise a HVAC monitor 200 comprising a condensing unit connector, a wetness monitor system 300, and a communicator 900 wherein a communicator accesses a location of the building monitoring system and selectively communicates with a technician or a user based at least in part on the location.

Figure 2:
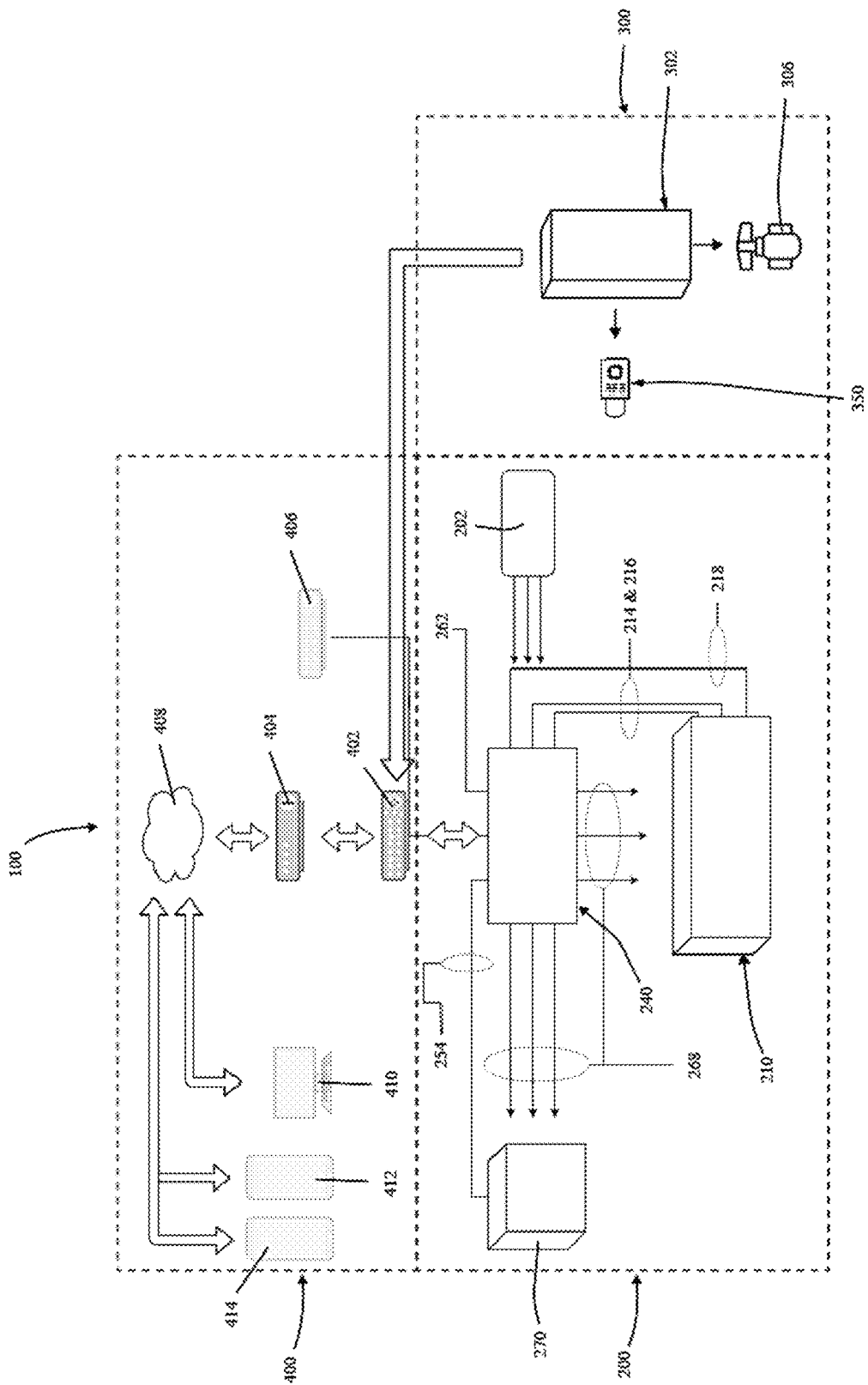
FIG. 2 illustrates a high-level functional block diagram of a building monitoring system in accordance to one, or more embodiments.

Referring to FIG. 2, illustrates a high-level functional block diagram of a building monitoring system shown generally at 100. The control module or HVAC monitor 200 can comprise a monitoring center module 240, a condenser module 270 attached to a condenser unit 272 (often, outdoors), and an air handler module 210 attached to an air handler 226 (often indoors) wherein the monitoring center module can be connected between the condenser module, thermostat 202, and the air handler module. The condenser module 270 and the air handler module 210 can be connected to the monitoring center module 240 by one or more control wires 268 wherein the control wires can be the already exiting wires within the building that electrically connect a thermostat 202, an air handler 236, and a condenser unit 272 together. The monitoring center module 240 can be bypassed if failure occurs within the monitor center module allowing the air handler unit 226, the thermostat 202, and the condenser unit 272 to continue to operate if the HVAC monitor 200 fails.

A wetness monitor system 300 can further comprise a wetness detection module 302, a shut-off valve 314, and one or more remote wetness detection module 350. The monitoring center module 240, and the wetness monitoring system 300 can both be connected to a to a router 402 and/or a wireless network 404, or a hardwired to a LAN system wherein the communicator and/or on-demand technician repair system 900 can comprise of a computing system 610 wherein it can communicate through a cloud service 408, or for example, a local network, storage area network, metropolitan area network, wide area network, connecting to for example, a infrastructure-as-a-service, platform-as-a-service, or software-as-a-service to the monitoring center module 240. The computing system 410 can execute algorithms to determine what is wrong with the system by the error codes given, pull and store customer information, determine the location of the closest technicians to the user, determine where at in the system failure has occurred, and relay information to an application on a technician's wireless device 614, or a user's wireless device 612.

Figure 3:
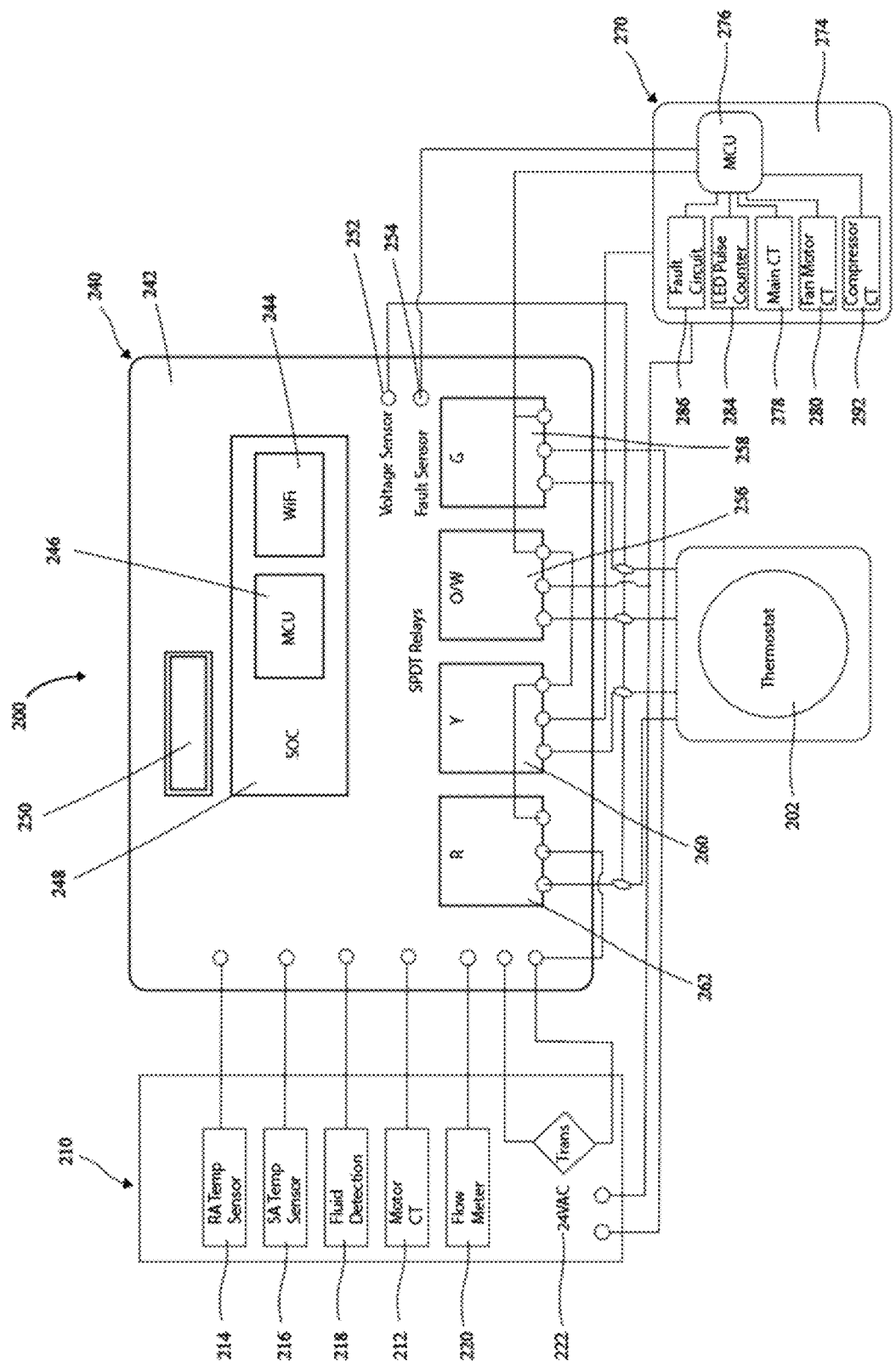
FIG. 3 illustrates a functional block diagram of a sub-system of a building monitoring system in accordance to one, or more embodiments.
Figure 4A:
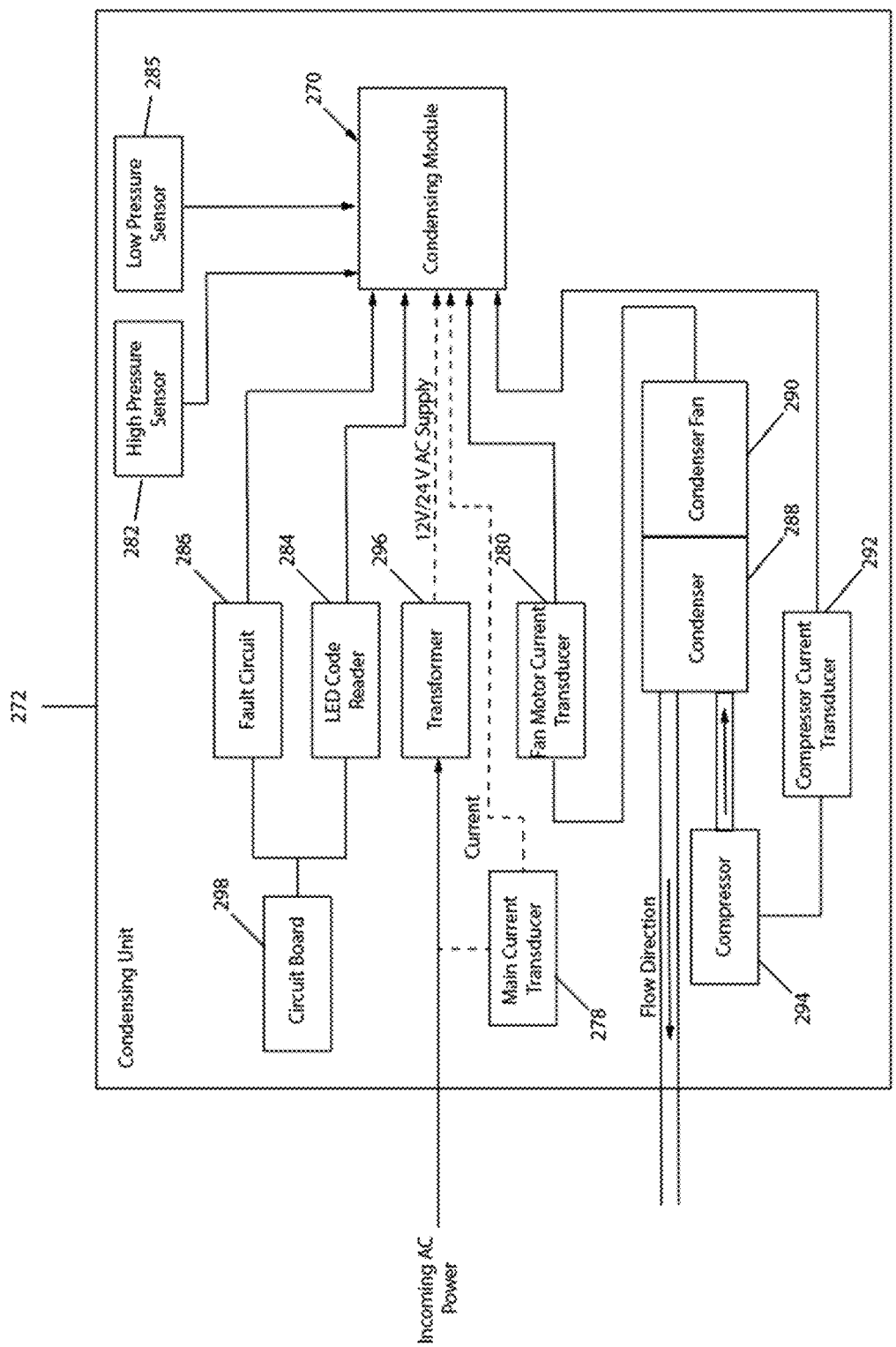
FIG. 4A illustrates a sub-system of a condenser unit in location of a building monitoring system located in accordance to one, or more embodiments.
Figure 4B:
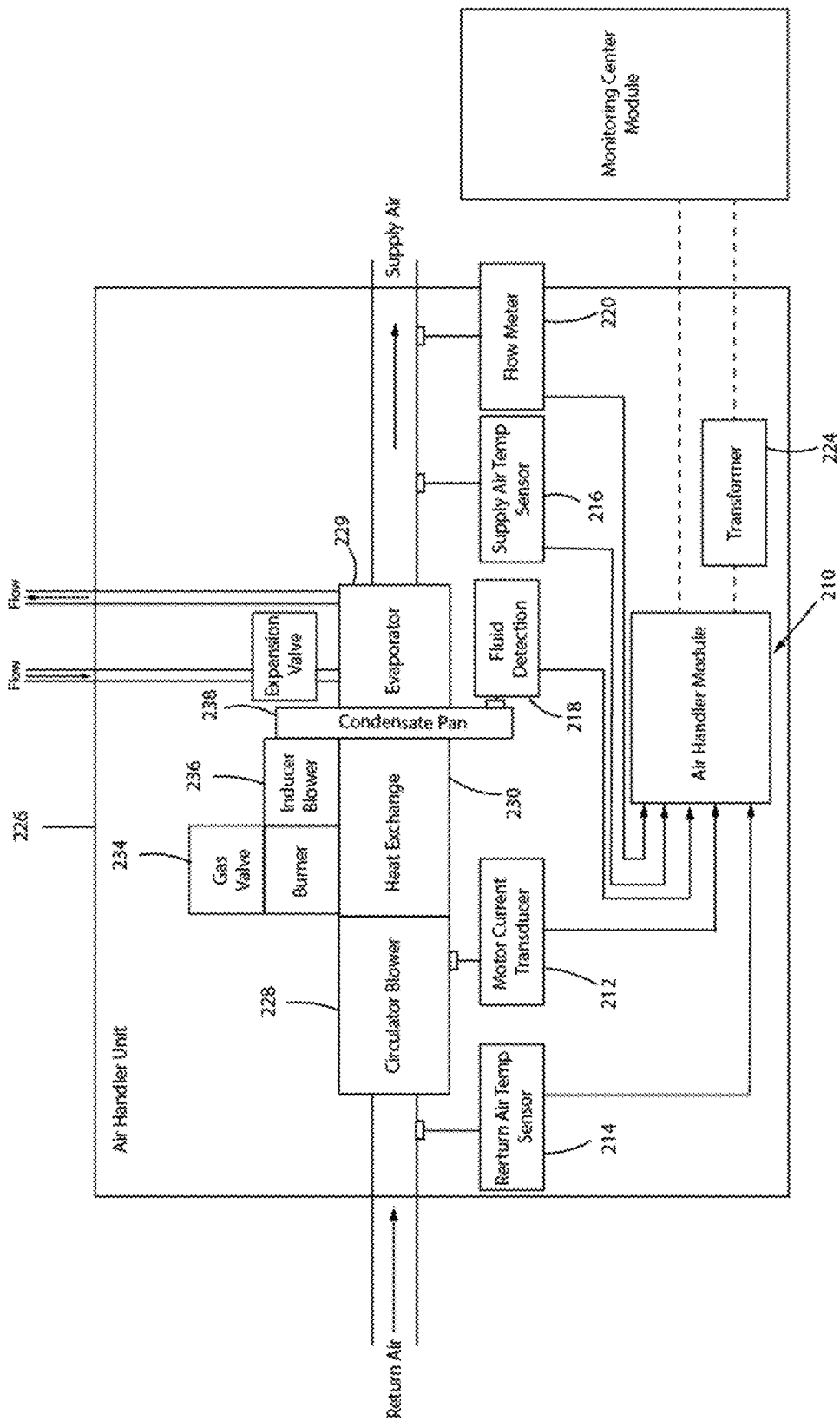
FIG. 4B illustrates the sub-systems of an air handler unit in location of a building monitoring system located in accordance to one, or more embodiments.
Figure 4C:
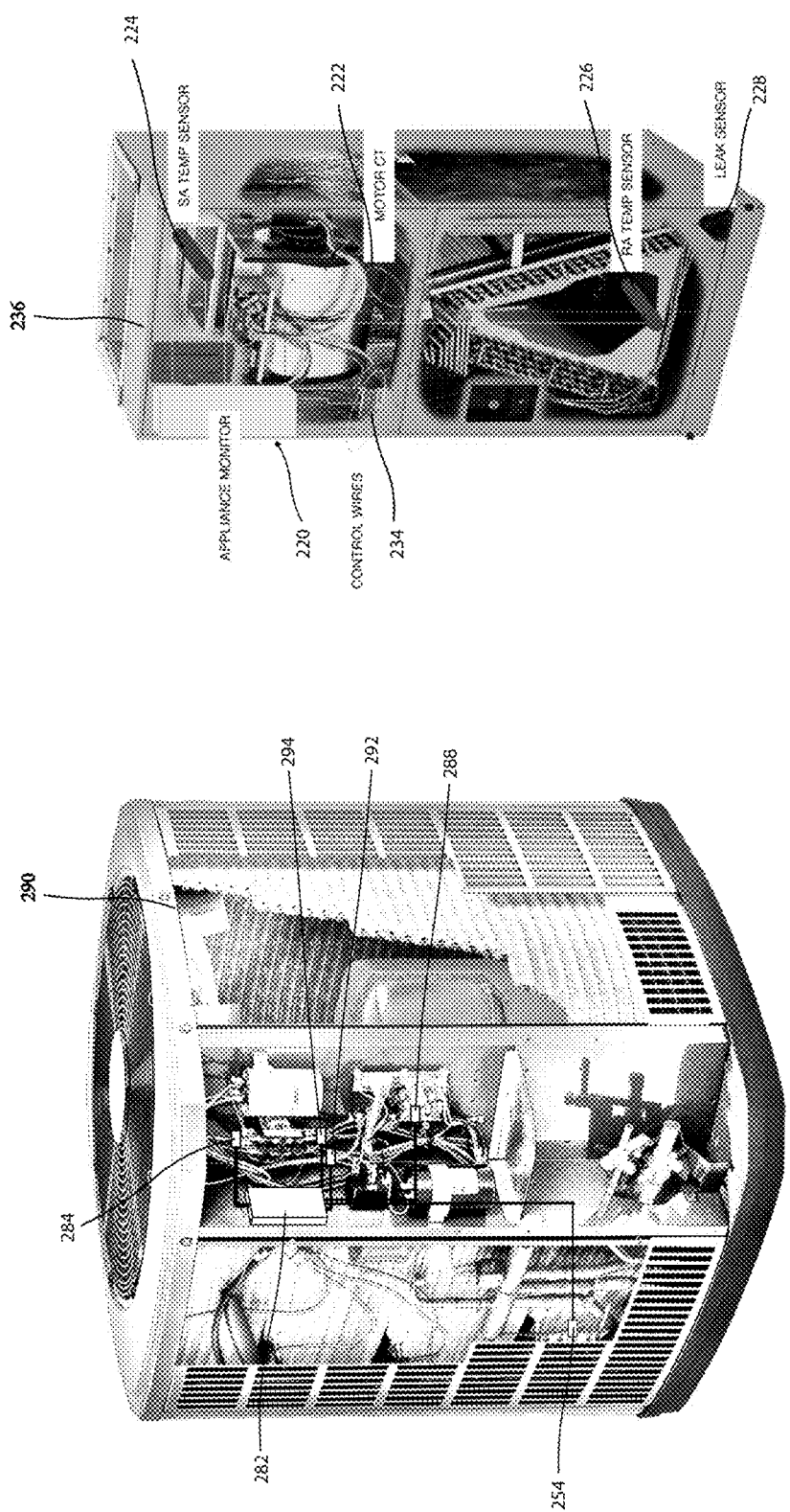
FIG. 4C illustrates a diagram of a condenser unit and air handler in location of a building monitoring system located in accordance to one, or more embodiments.

Referring generally to FIG. 3 through 4C, which illustrates a functional block diagram and layout of a sub-system, the HVAC monitor 200, of the building monitoring system 100. The HVAC monitor 200 can comprise a monitoring center module 240. The monitoring center module 240 can comprise a printed circuit board ("PCB") 242 base material which can be manufactured out of a single sided, double sided, multilayered, flex, or the like. The PCB can have a system on a chip ("SOC") 248 having a microcontroller unit ("MCU") 246, and a transceiver and/or communications module 244 wherein the MCU can execute programmed instructions and can have embedded software that can be store and/or pull from a memory medium (not shown) which can be integrated on either on MCU or on the PCB, or can be its own separate device. The memory medium (not shown) can be for example, random access memory, flash memory, read/writeable memory, or the like. The embedded software can be stored on the memory medium (not shown) to provide executable commands to the MCU 246, the transceiver and/or communication module 244, the condenser module 270, and the air handler module 210, in addition it can send and control the data that can be transmitted to a remote communications network. The transceiver and/or communications module 244 can be, for example, a BLUETOOTH Low Energy (BLE), BLUETOOTH module, Wi-Fi module, IEEE 802.15.4, Z-Wave, Single/Dual Mode Radio Chip, LoRaWAN™ networking device or the like. The MCU 246 and transceiver and/or communications module 244 can be combined into a one module chip, or can be separate modules on the PCB. The monitoring center module 240 can be placed into a protective casing (not shown) wherein the protective casing can have one or more mounting brackets to attach itself to the condenser unit 272, or the air handler 236. The monitoring center module 240 can be attached to the condenser unit 272, or the air handler unit 236 by one or more fasteners, zip ties, wire clamps, or the like. The protective casing or housing can be made of plastic, stainless steel, aluminum, or the like.

The monitoring center module 240 can further comprise at least one relay 256, 258, 260, 262 and a power supply 250 which can be at least one battery wherein the relay switches can correspond and connect to the typical naming terminals of the HVAC system such as for example, R switch 262 can correspond to 24 Volts hot feed from a control step down transformer that can power the relay, contractor, or complete the circuit board feeding it with 24 volts when the thermostat 202 calls for the whatever is set. The Y switch 260 can correspond to the Compressor 294, or the terminal that will turn on the air conditioner and can typically be terminated at the compressor in the condenser unit 272. The O/W switch 256 can correspond to the heating, electric furnaces, boiler systems, and the backup heat for the heat pump. The G switch 258 can correspond to a condenser fan 290, which is the fan that circulates throughout the ductwork system. The thermostat 202, the condenser module 270, and the air handler module 210 can be connected to each other by the corresponding control wires 268 coming from the air handler module 210 to the condenser unit 272 and thermostat 202. The relays 256, 258, 260, and 262 can allow the thermostat 202, condenser unit 272, and air handler unit 226 to bypass the monitoring center module 240 if failure occurs on the monitoring center module, allowing for continuous operation within the HVAC system. The relay switches can be for example, electromagnetic relays, induction relays, solid state relays, thermal relays, reed relays, high or low power subminiature relays, or the like which can be for example, single pole double throw, single pole single throw, double pole single throw, double pole double throw, or the like. The relays 256, 258, 260, 262 can be set to normally open, and/or to normally closed wherein when the relay switches are set to normally open the monitoring center module 240 can be bypassed and the system functions as if the monitoring center module is not a part of the HVAC system. In certain embodiments, the relay switches can be omitted, and the control wires can connect the air handler 236, and condenser unit 272, and the thermostat 202 by for example, PCB, GPIOs, or the like.

The power supply 250 can be capable of powering a solid-state device and/or sensors, can be for example, a lithium ion battery, a nickel cadmium battery, an alkaline battery, a lithium battery, or the like. The battery 118 can be rechargeable wherein the monitoring center module 240 can have a charging port (not shown), allowing the user to electrically charge the battery, and/or the battery can be removed and replaced with a new battery. In certain embodiments, the battery 118 can be rechargeable by induction circuitry, allowing the user to remotely electrically charge the monitoring center module via external induction circuitry. In certain embodiments, a power supply (not shown) can provide power to some or all of the components of the monitoring center module, condenser monitor module, and air handler module 210. In other embodiments, the monitoring center module 240 can be powered by the power running from the air handler unit 226, or the condenser unit 272.

The monitoring center module 240 can further comprise a voltage sensor input 252, and a fault sensor 254 wherein the voltage sensor input can be connected to the HVAC systems main power wherein the voltage sensor input can detect power failure within the system. The fault sensor 254 can be connected to the air handler monitor 210 wherein the fault sensor input can target different faults or errors within the HVAC system such as, but not limited to, for example, low refrigerant charge, refrigerant overcharge, noncondensable gas in the refrigerant, liquid-line restrictions, compressor valve leaks, condenser and evaporator fouling, or the like which can be determined by the algorithm on the memory medium or on the Cloud based computing system 408. The fault sensor 254 can be connected to the monitoring center module's 240 MCU for data storage, data diagnostics, and/or transmission to cloud server 408 via transceiver and/or communication module 244 for data diagnostic and transmission to user or technician's wireless device. The monitoring system can continuously monitor the HVAC system, which can collect the data, diagnose it, and then compare to the manufacturer's suggested nominal operating conditions. In certain embodiments, the data collected by the monitoring system can be sent to the manufacturers for them to diagnose the problem parts within their HVAC units. The fault sensor 254 can be connected to the condenser module 270 through an extra thermostat wire, or through a wireless communications device to the air handler module 210. The fault sensor 254 can be a back-up or a replacement to the wireless communications device when something is wrong within the HVAC system wherein the fault sensor can communicate directly within monitoring center module.

The condenser module 270 can comprise a printed circuit board ("PCB") 274 having a condenser monitor MCU 276.

The condenser module PCB 274 can be for example, a base material for the condenser module 270 wherein the PCB can be manufactured out of a single sided, double sided, multi-layered, flex, or the like. The condenser monitor 270 can further comprise one or more general purpose input/output ("GPIO"), and at least one condenser or furnace sensor wherein the GPIOs or controllers can connect to the condenser or furnace sensor wherein the condenser or furnace sensor can be but are not limited to, a main current transformer ("CT") sensor 278, a high-pressure sensor 282 and low pressure sensor 285, a fan motor current transducer 280, a compressor current transducer 292, a fault circuit 286, and a LED code reader 284. The condenser module 270 can monitor, store data from, and translate data from, but are not limited to, current, voltage, pressures, and temperatures. In some embodiments, the condenser module 170 can further comprise a wireless communications device. The condenser module 270 can be connected to the monitoring center module 240 through a wireless communication device such as, for example, BLUETOOTH Low Energy (BLE), a BLUETOOTH module, Wi-Fi module, IEEE 802.15.4, Z-Wave, Single/Dual Mode Radio Chip, a networking device or the like, or a hardwired device such as, a LAN device or the HVAC systems control wires 268. The condenser module 270 can have a memory medium, having the same properties as of the monitoring center module's 240 memory medium having algorithms that control and read the attached sensors, and determine when to transmit the information to the monitoring center module and from the monitoring center module to the cloud system computing system 410.

The main current transformer ("CT") sensor 278 can measure the alternating current ("AC") within the condenser unit 272 wherein the condenser MCU 276 can monitor the nominal operating conditions of the current going through the condenser unit 272 and can transmit an error as the condenser unit's current shifts. The condenser MCU 276 can relay the error to the control module 200 wherein the control module can transmit the error to a user and/or technician. The main CT sensor 278 can be for example, alternating current sensor, direct current sensor, Hall effect IC sensor, current clamp, fiber optic current sensor, Rogowski coil, or the like. The main CT sensor 278 can attach to, or connect to the HVAC units power supply allowing the user to monitor spikes in current, or nominal operating conditions of the HVAC system and condenser unit 272. The main CT sensor 278 can monitor and measure the entire current entering the condenser unit 272 and thus determine the voltage of each current-consuming component within or attached to the condenser unit.

The fan motor CT 280 can be placed on or around the condenser fan motor's wires (not shown) wherein the fan motor CT can measure the current being drawn by the condenser fan 290. The fan motor CT 280 can monitor and alert the technician, or user of for example, a bad fan motor, incorrectly sized motor, overamping due to the wrong start run capacitor being installed, poor airflow by not having the fan blades installed correctly, lack of maintenance such as lubrication, or the like. The fan motor CT 280 can have the same properties as the main current CT 278. In other embodiments, a temperature probe (not shown) can be placed on or near the fan motor to sense its temperature and determine if the motor is overheating by for example, an infrared sensor, thermocouple, resistance temperature detector, or the like. In embodiments, the compressor current transducer 292 can be placed or attached to a compressor 294, and can be connected to an input on the condenser unit's PCB or can be connected to the condenser MCU, or an input on the module. The compressor 294 helps control the amount of pressure applied to the refrigerant needed for removing heat to keep the building cold wherein the compressor current CT 292 can monitor for example, whether the compressor is sluggish or remains in the "on" cycle, whether the unit starts, the compressor stutters and does not come on efficiently, overloads or overheats, or the like.

The LED code reader 284 can be attached to the condenser unit 272 or onto a support bracket (not shown) that is attached to the condenser unit next to or directly over the condenser unit's circuit board 298 wherein the circuit board can have an LED light that blinks at different intervals for various error codes within the HVAC system or condenser unit 272. The LED code reader 284 can be connected or attached to the condenser module 270 by lead wires into the condenser modules GPIOs or other inputs wherein the condenser module can interpret, store, and/or transmit the error code the LED blinks on the condenser unit's circuit board. The condenser module 270 can transmit the error code to the monitoring center module 240 wherein the monitoring center module can transmit that error code to the cloud system 408 and then onto the user, or technician. The LED code reader 284 can be for example, a photo diode sensor, infrared sensor, photovoltaic sensor, proximity sensor, or the like. The LED code reader 284 can be placed in HVAC systems that are a single HVAC unit, a ductless split system, a packaged system, a geothermal HVAC system, or a gas furnace within the building.

The high-pressure sensor 282 and low pressure sensors 285 can connect to a high-pressure switch ("HPS") and a low-pressure switch ("LPS"), both not shown within the figure for simplicity, wherein the HPS can monitor the system for but not limited to, an inoperative motor, and dirty or restricted condenser coil, fans on coils bent, blockage of refrigeration system, and the LPS can monitor but not limited to, the refrigeration system for loss of refrigerant charge of the condenser unit 272, blower motor failure in air handler, plugged evaporator coils, and failure of refrigeration component within the refrigeration system. The high-pressure sensor 282 and low pressure sensor 285 can detect the nominal operating conditions of the HVAC system, and can relay information to the condenser unit MCU if those operating conditions change from the nominal operating conditions, and can be stored, and/or transmitted to Monitoring Center Module 240 and then to the user or technician through the cloud system 408. The high-pressure sensor 282 and low pressure sensor 285 can be for example, a PN photodiode, PIN photodiode, Avalanche photodiode, Schottky photodiode, or the like. The high-pressure sensor 282 and low pressure sensor 285 can attach in line, or through a fitting on the high and low pressure lines which can allow the user to determine the difference between the HPS and LPS within the condenser.

The fault circuit 286 within the condenser unit 272 can be attached to or in line with the circuit board 298 and attached to the condenser module 270 GPIOs or input within the condenser modules PCB wherein the fault circuit can detect errors detected by the circuit board within the condenser unit. The condenser transformer 296 can be connected to or attached to the condenser module 270 wherein the other side can be connected to or attached to the monitoring center module 240 or the circuit board 298 wherein the condenser transformer 296 can protect over current within the system. The transformer can be for example, paramagnetic, instrument current transformers, single-phase linear power transformer, switch mode transformer, line matching transformer, or the like. The air handler transformer 224 can be the same as the condenser transformer 296.

The air handler module 210 can comprise of an air handler PCB 211 which can comprise one or more GPIOs (not shown) or electrical inputs that can connect one or more sensors directly to the monitoring center module 240 or the monitoring center module can comprise of GPIOs that can be incorporated to the air handler module as one system, or the air handler module can be its own system having a MCU, memory medium, and a communications device that can transmit information to the monitoring center module. The monitoring center module 240 can include one or more expansion ports such as GPIOs, LAN port, USB ports, or the like to allow for additional connection of sensors and/or allow connections for other devices such as computer device, handheld computer device, tablets, and or a home security system. The air handler module 210 can monitor, but are not limited to, current, voltage, pressures, and temperatures. The air handler module 210 can further comprise at least one sensor wherein the sensor can be, but not limited to, an air handler motor current transducer 212, one or more temperature sensors such as a return air temperature 214 and a supply air temperature 216, a fluid detection sensor 218, and a flow meter 220 wherein the air handler motor current transducer 212 can measure the current delivered to the air handler unit 226 from the electrical panel (not shown). The air handler motor current transducer 212 can be the same as the condenser unit's main current transducer 278. The air handle motor current transducer 212 can be connected to, clamped around, or attached to the circular blower 228 by its wires, or within the circulator blower itself. In other embodiments, the circular blower 228 can be monitored by a speed switch to monitor critical speed, and guard against slowdown or stoppage during nominal operation. The motor current transducer 212 can be attached to and monitored by either the monitoring center module 240, or the air handler module 210.

One or more temperature sensors 214, 216 can be placed into the air handler unit wherein a temperature sensor can be placed into or connected through the supply air plenum and another temperature sensor can be placed into the return air plenum of the condenser unit. The temperature sensors 214, 216 can be placed into and/or inserted into holes drilled or punched into the plates inside the air handler unit or outside of the supply or return air plenum box. The temperature difference or delta between the temperature sensors 214, 216 can determine whether there is a performance error within the system, and it can isolate the error within the HVAC system by transmitting the temperature differences and the temperatures to the cloud system 408. In certain embodiments, temperature sensors can be connected to a suction line (usually in a furnace), and/or a liquid line (usually in an outdoor HVAC system), or the like wherein the temperature sensors can relay the suction line temperatures, or the liquid line temperatures to the monitoring center module 240. The suction line temperature can measure the refrigerant line temperature between the evaporator (not shown), and the compressor. The liquid line temperature can measure the refrigerant temperature of the refrigerant in the liquid line traveling from the condenser to the expansion valve (not show). The temperature sensors 214, 216 can be for example, thermocouples, thermistor, resistance temperature detectors, semiconductor-based sensors, or the like.

The fluid detection sensor 218 can be connected to or attached to the air handler unit condensation pan 238 or into a flood switch (not shown) which can be threaded into a secondary pipe outlet on the air handler. The fluid detection sensor 218 can be attached to the monitoring center module 240 for data translation, wherein the fluid detection sensor can measure the condensation levels in the condensate pan, flood switch, or the like. The fluid detection sensor 218 can measure condensation levels within the HVAC system and can determine when the levels are too high which can indicate a plug within the condensation pan, or problem with the pumps or hoses that are used for drainage within the air handler unit 226.

The flow meter 220 can be attached to or connected to the supply air of the air handler wherein the flow meter be placed directly in the flow path of the supply air, or inserted into the supply air conduit. The flow meter 220 can measure the nominal operating condition of the air flow through the HVAC system. The flow meter 220 can be for example, differential pressure flow meters, static pressure probe, velocity flow meters, positive displacement flow meters, mass flow meters, for open channel flow meters—weirs, flumes, submerged orifices, current meters, acoustic flow meters, or the like. The flow meter 220 can be attached to the monitoring center module 240 or the air handler module 210 for data translation, wherein the flow meter can measure the velocity, air flow, volume flow, or the like of the air as it flows through the supply air ducts. In certain embodiments, the flow meter 220 can be attached to or connected to the return air of the air handler unit 226. The monitoring center module 240 can also monitor the control signals coming from the thermostat 202 which can be connected to the monitoring center module 240 by the relay 256, 258, 260, 262. The thermostat 202 can send control signals to the air handler unit 236, and condenser unit 272 through the monitoring center module wherein the monitoring center module can send the thermostat's control signals to the user or technician via a transceiver, and/or wireless or wired communications module 244.

The HVAC system (not shown) can have a nominal operating condition wherein the system will produce a certain amount of current when running. The monitoring center module 240 can store these nominal operating conditions, and then transmit and upload the collected data at predetermined interval to the cloud system 408 for data interpretation through a computing system 410 wherein the computing system can store the nominal operating conditions for different HVAC systems manufacturer and model types. The uploaded data can be compared to the manufacturers nominal operating conditions, or the data can be sold, and/or sent to the manufacturer for the manufacturers analysis on the parts that see more occurrence of failure over another part. The data collected can be serialized and related to that particular manufacturer's HVAC unit. The manufacturer and technician can analyze the data to see trends on the HVAC units at the user's building. The air handler module 210 can further comprise a transformer 224 wherein the transformer can provide a stepped-down voltage, such as 24 volts to the monitoring center module 240, and the condenser module 270 and in certain embodiments the monitoring center module can have its own transformer, or can have a transformer that step-downs the voltage for the condenser module, and air handler module.

Figure 5A:
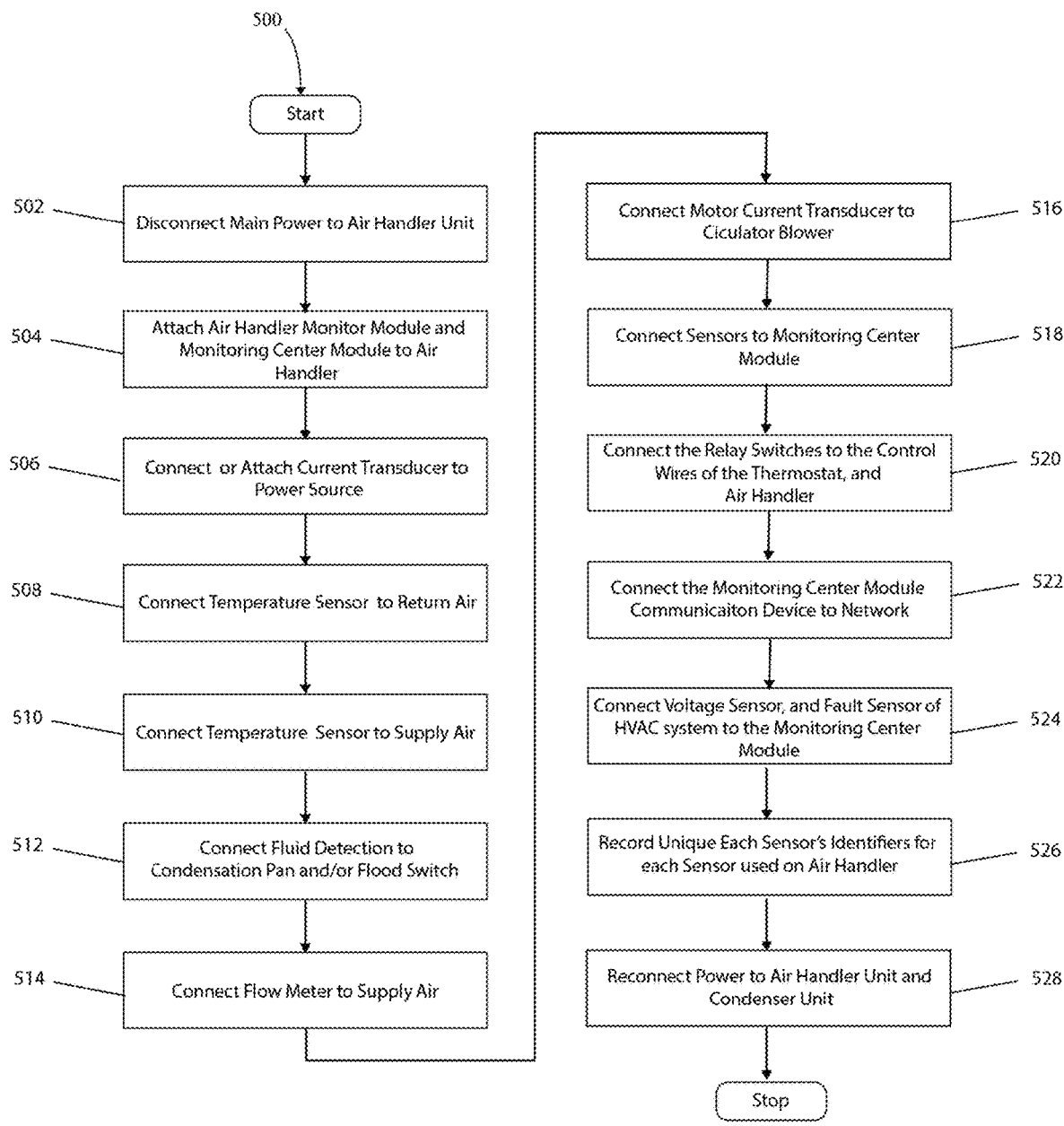
FIG. 5A illustrates a flowchart depicting the installation of the air handler module of an HVAC monitor in accordance to one, or more embodiments.

Referring to FIG. 5A, a flowchart depicting an example installation process of an air handler module 210 shown generally at 500. Although the FIG. 5A is shown with arrows indicating a specific order of operation, the order of operation in not limited to the order shown. At 502, the main power to the air handler unit can be disconnected, if there is not a main power or no outside power to the air handler then the main power to the house, or electrical box can be turned off. At 504, attach or connect the air handler module and/or the monitoring center module to the inside or outside of the air handler unit by fasteners, tape, hooks, hook and loop fasteners, or the like. At 506, connect or attach the current transducer to the power source, and connect the main current transducer's leads to the air handler module and/or the monitoring center module. At 508, attach or connect the temperature sensor to the return air duct work and connect the temperature sensor to the GPIO or electrical input of the monitoring center module and/or the air handler module. In certain embodiments, there can be one or more temperature sensor positioned in the return air duct work to get an array of temperatures throughout the return air duct and then can transfer that feedback from the sensors to the monitor center module to the technician or user. At 510, attach or connect the temperature sensor to the supply air duct work and connect the temperature sensor to the GPIO or electrical input of the monitoring center module and/or the air handler module. In certain embodiments, there can be one or more temperature sensor positioned in the supply air duct work to get an array of temperatures throughout the supply air duct and then can transfer that feedback from the sensors to the monitor center module to the technician or user. At 512, connect or attach the fluid detection sensor to a condensation pan and/or flood switch wherein if refrigerant condensation occurs the user and/or technician can receive an alert wherein the fluid detection sensor can be attached to the GPIO or electrical input of the monitoring center module or air handler module. At 514, connect or attach the transducer to flow meter to the supply air through a fitting or inlet, placing the flow meter into the flow for either static and/or dynamic air pressure.

At step 516, connect motor current transducer to the circulator blower wherein the motor current transducer can measure and diagnose problems with the circulator blower for example, its current, its duty cycle, its spin rate, if it is overheating, whether there are loose wire connections, whether there is a loose or faulty blower door switch, if the control board has bad relay, or the like. At step 518, connect all sensor from the air handler unit to the monitoring center module, or the air handler module wherein the sensors can be connected to the GPIO, or electrical inputs of the monitoring center module and/or air handler module. At step 520, connect the control wires of the thermostat, and/or air handler and/or furnace to the relay switches on the monitoring center module either to the normally closed or normally open position of the switches. At step 522, connect the monitoring center module to the communicator, or network hub. The monitoring center module can be connected to a wireless communication device, or a wired communication device, or a wireless hub that can keep a consistent password, or IP address and then to a wireless communication device. At step 524, connect the voltage sensor, and fault sensor of the HVAC system to the monitoring center module wherein the voltage sensor, and fault sensor can transmit error codes, and the HVAC systems overall current running through the system wherein the nominal operating conditions for the that particular make and model can be stored and compared to the running conditions. At step 526, each sensor within the air handler unit can have a unique identifier wherein that identifier can be associated to the sensors location within the HVAC system, the sensor type, and the sensor's calibration. The sensor's unique identifier can be scanned in, and/or recorded within the air handler module, monitoring center module, and/or the computing system 410. The unique identifier can be a QR code, bar code, RFID, UUID, or the like. At step 528, reconnect the power supply to the air handler unit, and power on the air handler module, and the monitoring center module.

Figure 5B:
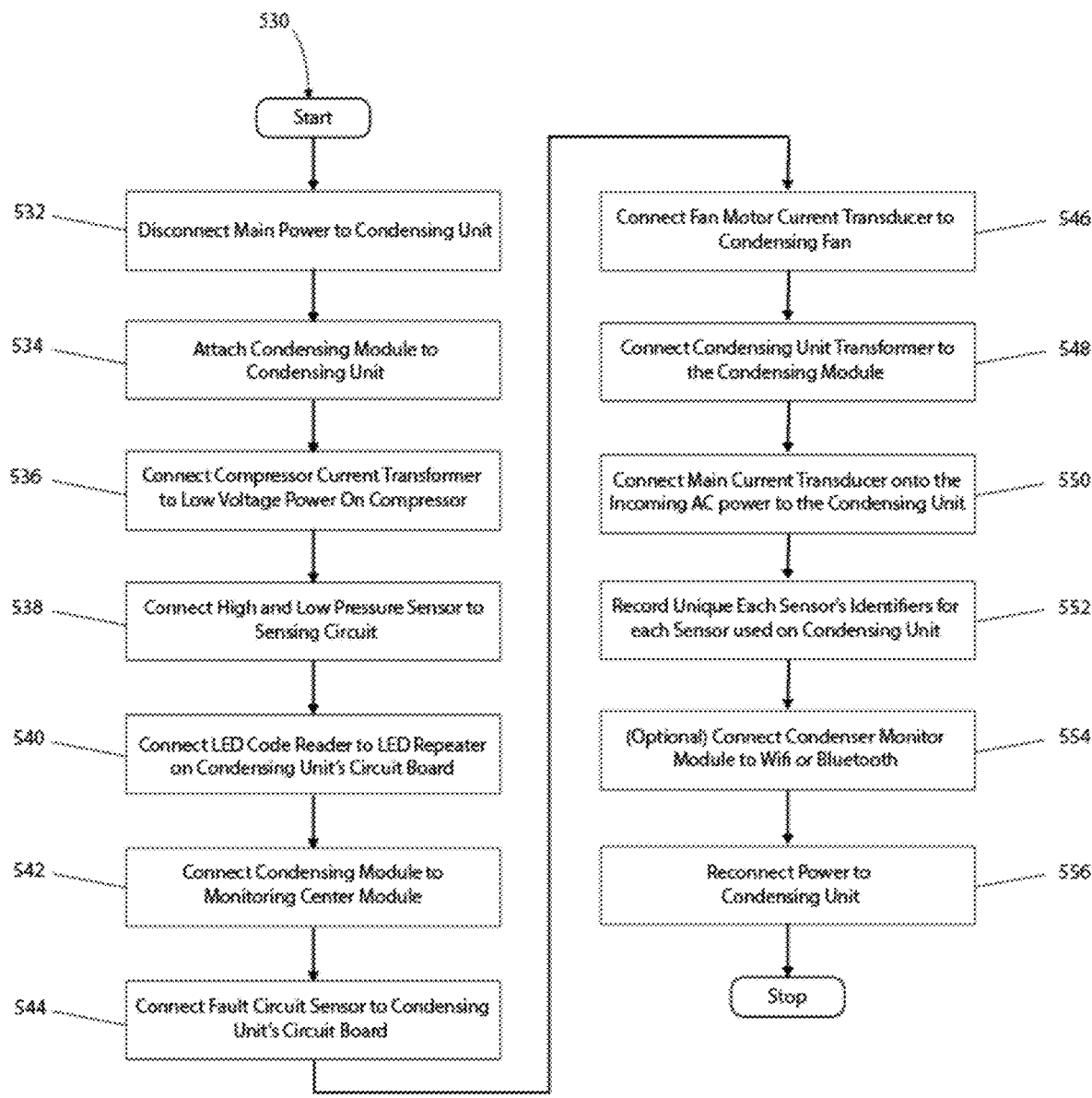
FIG. 5B illustrates a flowchart depicting the installation of the condenser module of an HVAC monitor in accordance to one, or more embodiments.

Referring to FIG. 5B a flowchart depicting an example installation process of a condenser module 270 and/or furnace shown generally at 530. At step 532, disconnect main power to the condenser unit, if there is not a main power or no outside power to the condenser unit then turn off the main power to the house, or electrical box. At step 534, attach condenser unit module to the condenser unit wherein the condenser unit module can be attach to the condenser unit by for example, a bracket, double-sided tape, fasteners, tape, hooks, hook and loop fasteners, or the like. At step 536, connect the compressor current transformer to the low voltage power located on the compressor of the condenser unit. At step 538, connect the high-pressure sensor and the low-pressure sensor to the condenser unit's sensing circuit. The low-pressure sensor can detect the low-pressure gas as it comes into the compressor, and the high-pressure sensor can detect the pressure as it moves out of the compressor as a high-pressure gas. At step 540, connect the LED code reader to the LED repeater on the condenser unit's circuit board. At step 542, connect condenser module to the monitoring sensing module. At step 544, connect the fault circuit sensor to the condenser unit's circuit board. At step 546, connect the fan motor current transducer to the condenser fan. At step 548, connect the condenser unit transformer to the condenser module. At step 550, connect main current transformer onto or into the incoming AC power to the condenser unit. At step 552, record each sensor's unique identifier wherein that identifier can be associated to the sensors location within the condenser unit, the sensor type, and the sensor's calibration. The sensor's unique identifier can be scanned in, and/or recorded within the air handler module, monitoring center module, and/or the computing system 410. The unique identifier can be a QR code, bar code, RFID, UUID, or the like. At step 554, connect condenser module to WiFi, and/or to Bluetooth wherein the condenser module can transfer the collected sensor information, and compare it to the nominal operating conditions of the condenser unit. Step 554 is only required if the system is a stand-alone system and it not connected to the monitoring center module. At step 556, reconnect the power to the condenser unit.

Figure 6:
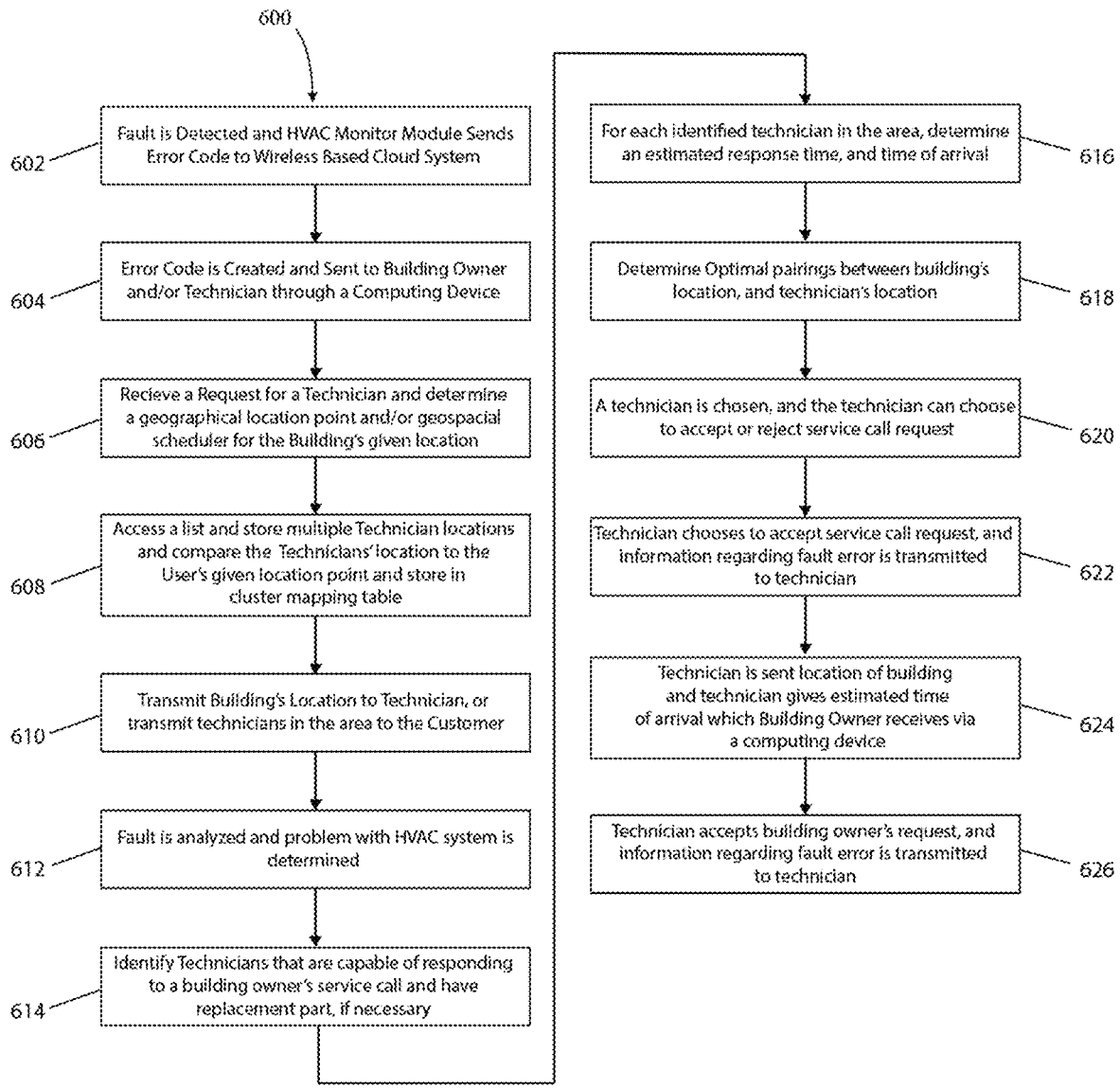
FIG. 6 illustrates a functional block diagram of the sub-system of a HVAC monitor wireless connection process in accordance to one, or more embodiments.

Referring to FIG. 6 a flowchart depicting an example installation process of detecting and transmitting a fault within the HVAC system as shown at 600. A method can be as shown in FIG. 6 can be implemented by using the components as described in FIGS. 1-4B. Therefore, references made to elements in FIGS. 1-4B can be made for clarity. At step 602, a fault error, or problem is detected within the air handler unit 226, or condenser unit 272 or furnace wherein the monitoring center module 240 can send an error code to a cloud service/system 408 wherein the monitoring center module can transmit data either wirelessly or through a wire connection through a wireless communications device 404, a wireless hub, a broadband modem, a hub connected to a switch, or the like. The fault or error detected can be within the air handler unit 226 and/or condenser unit 272 and/or furnace wherein the data transmitted can show where within the HVAC system, which can include the condenser unit 272, furnace (not shown), and the air handler unit 226, the fault has occurred. At step 604, an error code is generated and sent to a steward which can be a building owner, and/or a technician and/or service supplier through the cloud service/system 408 through a wireless or wired computing device 412 such as a smartphone, tablet, or computing device. The algorithms within the computing system 410 can translate the fault code comparing the thrown fault code to the HVAC's unit make, model, and nominal operating conditions, analyzing those numbers with the fault code given, and then sending the location within the condenser unit, where the fault has occurred.

At step 606, the building owner can receive a request for a technician based upon the geographical location point and/or geospatial scheduler from the building owner's given location wherein the monitoring center module 240 can transmit the building's location, or the building's location can be stored on the cloud system relating the monitoring center module to the building's location. At step 608, access the list of technicians or suppliers in the geographical location and/or geospatial scheduler and store the technician's location comparing the customer's location point storing both in a cluster mapping table. At step 610, transmit the customer's location to the technician, or the technician's locations to the customer. At step 612, if a fault or system error is detected the fault or system error is analyzed with either the monitoring center module, and/or to the computing system 410. An algorithm on the computer can take the translated fault code that was compared to the HVAC's unit make, model, and nominal operating conditions and the problem is then determined from step 604. At step 614, the technicians or supplier that are in the area that can respond to the customer's service call, and has a replacement part is identified. The computer system 410 can collect, store, and translate the data and send that information to the technician, or the user. In certain embodiments, the information can be used to send to manufacturer for their analysis of parts that fail.

At step 616, for each identified technician in the area the estimated response time is determined, and an estimated arrival time is sent. At step 618, the optimal pairings between the customer, and the technician is determined by geographical location point and/or geospatial scheduler. At step 620, a technician can be chosen by the user, and/or the technician can choose to accept or reject the user's service call request. At step 622, the technician chose to accept the service call request, and the information regarding the fault is transmitted to the technician. At step 624, technician is sent the location of the building and the technician can send an estimated time of arrival to the building owner, which the building owner can receive via a wireless computing system 412. At step 626, the technician accepts the building owner's request, and information regarding the fault error can be transmitted to the technician.

Figure 7:
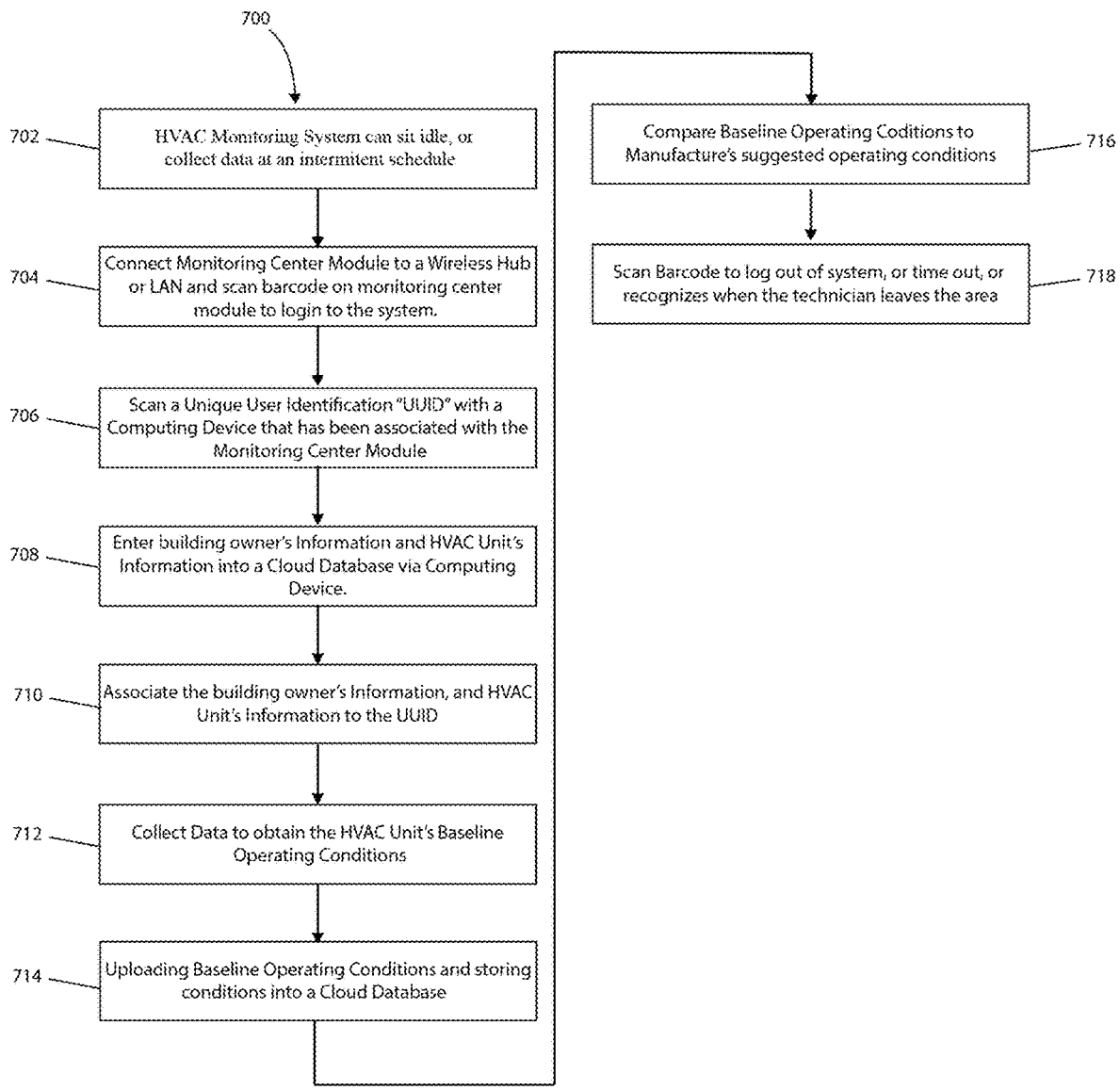
FIG. 7 illustrates a functional block diagram of the sub-system of a HVAC monitor wireless connection process in accordance to one, or more embodiments.

Referring to FIG. 7 a functional block diagram of the sub-system of a HVAC monitor wireless connection process is shown generally at 700. A method can be as shown in FIG. 7 can be implemented by using the components as described in FIGS. 1-4B. Therefore, references made to elements in FIGS. 1-4B can be made for clarity. At step 702, an HVAC monitor can either sit idle waiting for an event to happen, or can collect data from the various sensors analyzing the HVAC system. The condensing module, and/or the air handler module, and/or the monitoring center module can periodically check the sensor's status, can constantly check the sensor's status, or can activate when there is a fault error on a sensor which can then activate the modules. To reduce power consumption the air handler module 210, monitoring center module 240, and the condenser module 270 can remain in an idle state activating when a fault error has occurred. At step 704, connecting the monitoring center module 240 to the wireless network 404 or a LAN, or to a static hub wherein the IP address and password can remain constant if the building owner updates the wireless network's IP address and password, thus not effecting the service of the system. The technician and/or building owner can scan a barcode located on the monitoring center module 240, condenser module, and air handler module 210, to log into the monitoring center module 240 system. In certain conditions if the wireless network is lost and/or a connection cannot be made, an error is sent to the building owner, and/or technician alerting them that the system is not online, and that attention is needed to reconnect the building monitoring system 100 to the wireless network 404.

At step 706, a technician, and/or building owner can scan each sensor's, monitoring center module 240, condenser module 270, and air handler module 210 unique user identification "UUID" with a wireless communication device 412 and/or computing system 410 wherein each UUID can be associated with the sensor type, its location, its calibration points, and its location's nominal operating conditions for the building's HVAC unit's make and model. At step 708, the building owner or customer's information, and HVAC unit's information can be entered by a technician or building owner into a computing device 410 or a wireless communication device 412 and then uploaded to the cloud service/system 408. The customer's information can be for example, name, address, phone number, email address, or the like. The HVAC unit's information can be for example, model, serial number, unit number, age of unit, service record, or the like. At step 710, the building owner's information and the HVAC unit's information can be associated to each other and stored along with the UUID of each sensor and the condenser module 270, air handler module 210, and monitoring center module 240. At step 712, the monitoring center module 240 and/or condenser module 270 and/or air handler module 210 can collect the data from the sensors at each of the sensor's various locations throughout the air handler unit 226, and condenser unit 272. At step 714, once the monitoring center module is connected to the wireless network the data from the sensors can be collected and a baseline operating condition can be established for the air handler unit 226, and condenser unit 272.

At step 716, the baseline operating conditions can be compared to the nominal operating conditions that was established by the manufacturer for that make and model. The computing system 410 can execute an algorithm that will take the sensor's readings with the established baseline operating conditions of the air handler unit 226 and the condenser unit 272 and comparing those readings to the suggested manufacturer's nominal operating conditions, and determining if the air handler unit and the condenser unit fall within the manufacturer's nominal operating conditions. If the air handler unit 226 and the condenser unit 272 fall outside the manufacturer's nominal operating conditions then an error is giving and the sensor location of where the error has occurred can be sent to the technician, and/or building owner. At step 718, the technician and/or the building owner can scan the barcode on the monitoring system module 240 to log out of the monitoring system module, and/or the system can timeout if no activity is noticed from the technician or building owner, and/or the monitoring system module can recognize when the technician and/or building owner leaves the system's area.

Referring to FIG. 8 which is a non-exhaustive list of sensor locations in the air handling unit and condenser unit. Each row corresponds to a feature or location within the air handler unit and condenser unit that a sensor is monitoring and the type of sensor that is placed in that location. Temperatures, flow meters, and voltages can help pinpoint a fault error within the air handling unit and the condenser unit. For example, temperatures and air flow between the supply air and the return air and a change in pressure, flow, or temperature from the nominal reading can be an indicator that something is wrong within the system. The monitoring center module 240, air handler module 210, condenser module 270, furnace (not shown) and the accompanied sensors that are placed throughout the HVAC system can be installed by a technician, or a building user wherein the building owner can buy the HVAC monitor 200 as a complete unit and install the system, or the building owner can hire a HVAC technician or contractor to install the HVAC monitor. The HVAC monitor 200 can be installed as an aftermarket addition to the HVAC unit or can be integrated within the HVAC unit and sold as one complete system.

Figure 9:
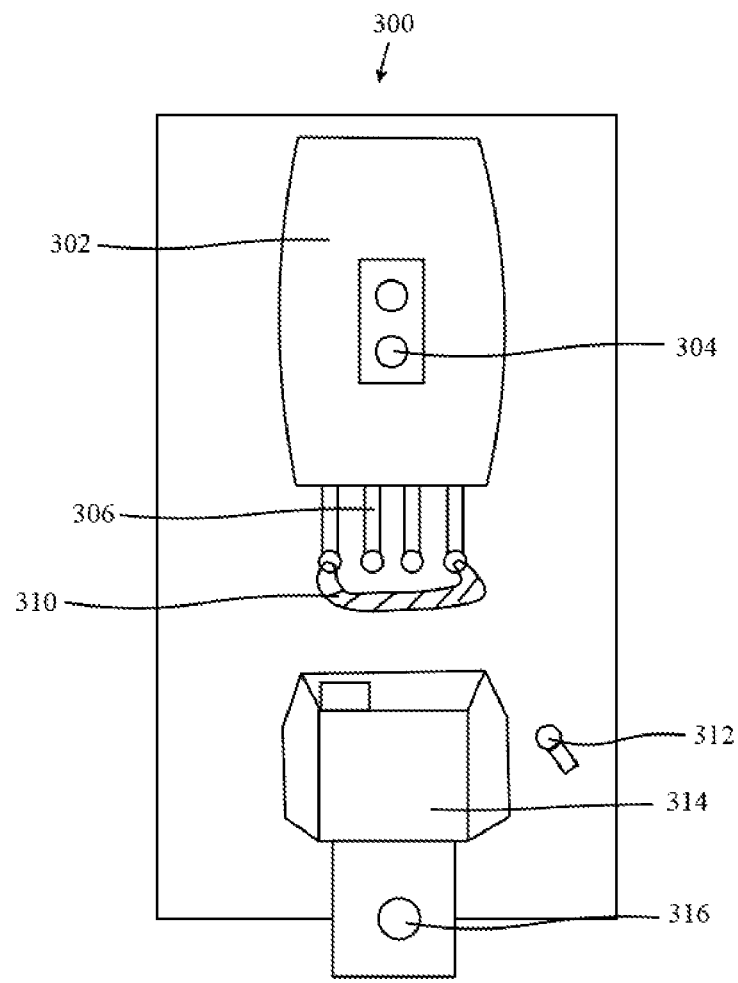
FIG. 9 illustrates a wetness monitoring system in accordance to one, or more embodiments.
Figure 10:
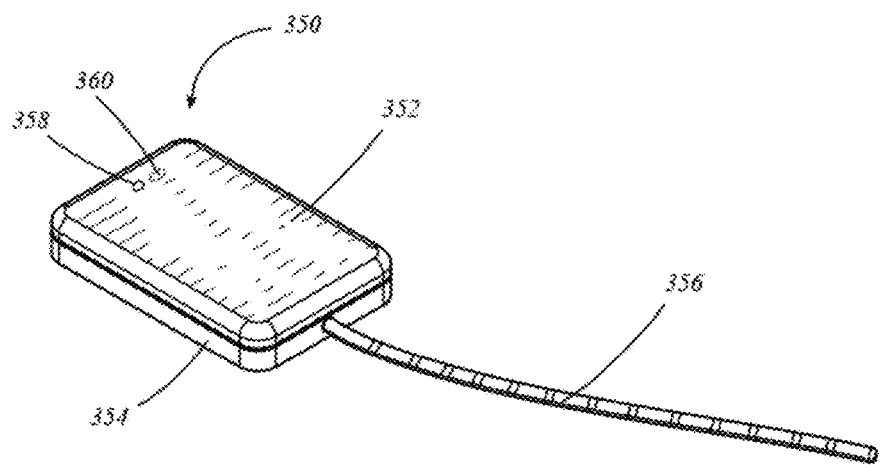
FIG. 10 illustrates a remote wetness monitoring module for detecting wetness in accordance to one, or more embodiments.
Figure 11:
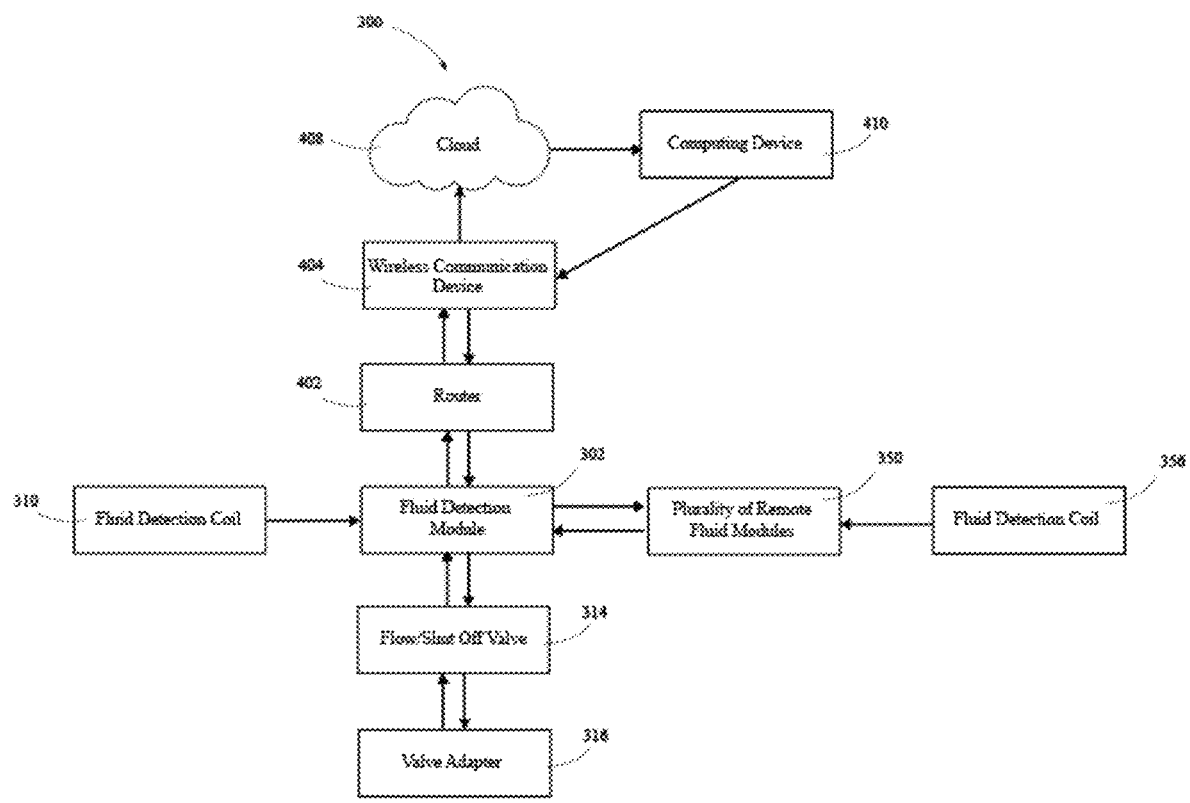
FIG. 11 illustrates a functional block diagram of a wetness monitoring system connecting to a cloud system and connected to a plurality of remote monitor modules.

Referring to FIG. 9 through FIG. 11, a main wetness monitor system is shown generally at 300. A wetness monitor system 300 can comprise a wetness detector 302, a wetness detection coil 310, a flow/shut off valve 314, and a power supply 308. The wetness detector 302 can comprise a housing 303, a wetness detection PCB 305 having a power switch 304, a micro-controller unit ("leak detection MCU") a wetness detection sensor 310, and a temperature sensor. The housing 303 can further comprise an upper body 318 and a lower body 320 wherein the wetness detection PCB 305 can be attach by one or more fasteners (not shown) to either the upper body and/or the lower body. The housing 303 can be for example, one piece, two pieces, three pieces or the like, and can be manufactured from plastics such as, for example, polyamide (nylon), glass filled nylon, Acrylonitrile Butadiene Styrene, polyethylene, polycarbonate, or the like, or from metals such as, for example, stainless steel, aluminum, titanium, Inconel, or the like. The housing can have one or more holes to allow for, but not limited to, the power switch 304, wetness detection coil 310, power supply 308, communication device 306 to have access to the outside environment, so that the user can connect to the wetness detection PCB 305. The housing 303 can vary in shape and in size to fit the PCB and its components, it can be for example, square, rectangular, circular, hexagonal, or any combination of shape with rounded or radius edges. The power switch 304 can be a mechanical switch such as, for example, push button, selector switch, limit switch, proximity switch, The wetness detection PCB 305 can have the same properties as the monitoring center module PCB 242. The wetness detection PCB can further comprise a communications port 306, a wireless communications device, a memory medium, a LED screen (not shown), and an optional LED light (not shown). The communication port 306 can be for example, Ethernet cable port, fiber optic port, coaxial cable port, or the like. The wetness detection wireless communication device can be such as, for example, BLUETOOTH Low Energy (BLE), a BLUETOOTH module, Wi-Fi module, IEEE 802.15.4, Z-Wave, Single/Dual Mode Radio Chip, a networking device or the like. The wireless communication device can transmit data packets to a cloud computing system wherein the cloud system can transmit information to a user's computing device. A wetness detection memory medium can be for example, random access memory, flash memory, read/writeable memory, or the like. Data from the wetness detection coil 310 and the temperature sensor 312 can be stored on the memory medium wherein the data can be collected at either a set interval, or when a wetness event is detected. The wetness event can be, but is not limited to, wetness under a sink, leak next to the toilet, wetness next to the refrigerator water dispenser, overflowing sump pump regress, or the like. The wetness detection MCU (not shown) can have embedded software that allows the MCU to execute programmed instructions that can be stored and/or pulled from the memory medium (not shown) which can be integrated on either on MCU or on the PCB, or can be its own separate device. The embedded software can be stored on the memory medium (not shown) to provide executable commands to the leak detection MCU, the leak detection communication module, the leak detection condenser module.

The wetness detection sensor 310 can be attached to or connected to the wetness detection PCB 305 either directly to it or through one or more GPIOs on the wetness detection PCB. The wetness detection sensor 310 can be for example, contact sensor, inductive coil, water leak sensing cable, or the like. The wetness detection sensor 310 can be between 1 inch and 6 feet, more preferably between 3 inches and 3 feet, and still more preferably approximately 6 inches. The wetness detection sensor 310 can extend from the wetness detection PCB and can extend to or wrap around the location it is place within the building. The wetness detection sensor 310 can be formed as for example, a straight, coiled, u-shape, circular or the like line that can be placed next to a leak area that may leak or flood (as shown in FIG. 12) such as, but not limited to, under the kitchen sink, next to refrigerator, under bathroom sinks, toilets, water heater, water closet, sump pump, or the like. The temperature sensor 312 can be attached to or connected to the wetness detection PCB 305 either directly to it or through one or more GPIOs on the wetness detection PCB. The temperature sensor 312 can be for example, a thermocouple, a resistance thermometer, thermistor, or the like. The temperature sensor can be placed in or around the plumbing where a leak could occur. In some embodiments, the temperature sensor can be omitted.

The wetness shutoff valve 314 can be removably, or permanently attached to the building's main water supply by a female or male NPT 316, soldered into position, or screwed into position. The wetness shutoff valve 314 can replace or be placed inline next to the building's water main shutoff valve. The wetness shutoff valve 314 can be such as, inline ball valve, gate valve, globe valve, or the like. The wetness shutoff valve 314 can be electronic wherein an electric motor can turn the valve to the on and off positions, and the wetness shutoff valve can be connected to a wireless communication system wherein the user can have access the wetness shutoff valve remotely. In the preferred embodiment, the wetness shutoff valve 314 can self-check itself wherein the electronics within the wetness shutoff valve can determine when the valve is in an open, closed, or partially open position, and send the status of the wetness shutoff valve to the user, and alert the user if there is a problem with the wetness shutoff valve. The wetness shutoff valve 314 can be connected directly to the wireless communication system, or can be connected to a wireless router. In certain embodiments, the shutoff valve 314 can have flow sensor, temperature sensor, and pressure sensor included to read the water and/or fluid's flow, temperature and pressure within the building.

A remote wetness detection module is shown generally at 350. A remote wetness detection module 350 can comprise a housing 355 having an upper housing 352, and a lower housing 354. A remote wetness detection module 350 can further comprise of an electrical component (not shown), and a wetness detection coil 356 wherein the electrical component can be placed into the housing 355 and the electrical component can be wirelessly connected to the main wetness monitor system 300 through for example, Bluetooth, Wi-Fi, Zigbee, or the like. The electrical component (not shown) can comprise a LED light 358, and an optional LED screen (not shown) wherein the LED light and/or LED screen can communicate to the user the status of the battery, the status of wireless connection, and/or the location of the remote wetness detection system 350. The remote wetness detection module 350 can have a unique identification associated with it either within the electrical components itself or on the remote wetness detection system itself wherein the unique identification can be associated to the location where the remote wetness detection module is located within the building.

The housing 255 comprising an upper housing 352, and lower housing 354 can be circular, square, rectangular, hexagonal, or the like in shape. The upper housing 352 can be attached to the lower housing 354 by a fastener which can be for example, screw, glue, pins, hooks, or the like creating a water proof seal to protect the remote wetness detection system 350 from water penetrating the electrical system. The wetness detection coil 356 can be attached to the housing 255 by a waterproof seal such as, for example, washer, O-ring seal, silicone seal, glue, or the like. The wetness detection coil 356 can be for example, contact sensor, inductive coil, water leak sensing cable, or the like. The wetness detection coil 356 can be for example, straight, circular, round, or the like to wrap around or be placed on the area with water. The remote wetness detection module 350 can be powered by a battery (not shown) that can be recharged or replaced.

A wetness detector 302 can be connected to a router 402 wherein the router can connect the wetness detector to a wireless communications device, wherein the wetness detector can send data through the router to a wireless communication device to a cloud system 408 wherein the cloud system can send status updates to the building owner via remote computing device 410. The cloud system 410 can have an algorithm to determine the wetness detector, and remote wetness detection modules locations within the building, the time the wetness is detected, the amount of wetness detected, and the give the user the option to turn off the shut off valve 314. The cloud system can send and receive information to a user, and to the wetness monitor system 300 wherein the algorithm, or the user can send a signal to the flow/shut off valve 314 to determine whether it is closed or open. In certain embodiments, the flow/shut off valve 314 can malfunction, and the algorithm within the cloud system 408 can self-check the flow/shut off valve to transmit the flow/shut off valve's status to the computing device 410.

Figure 13:
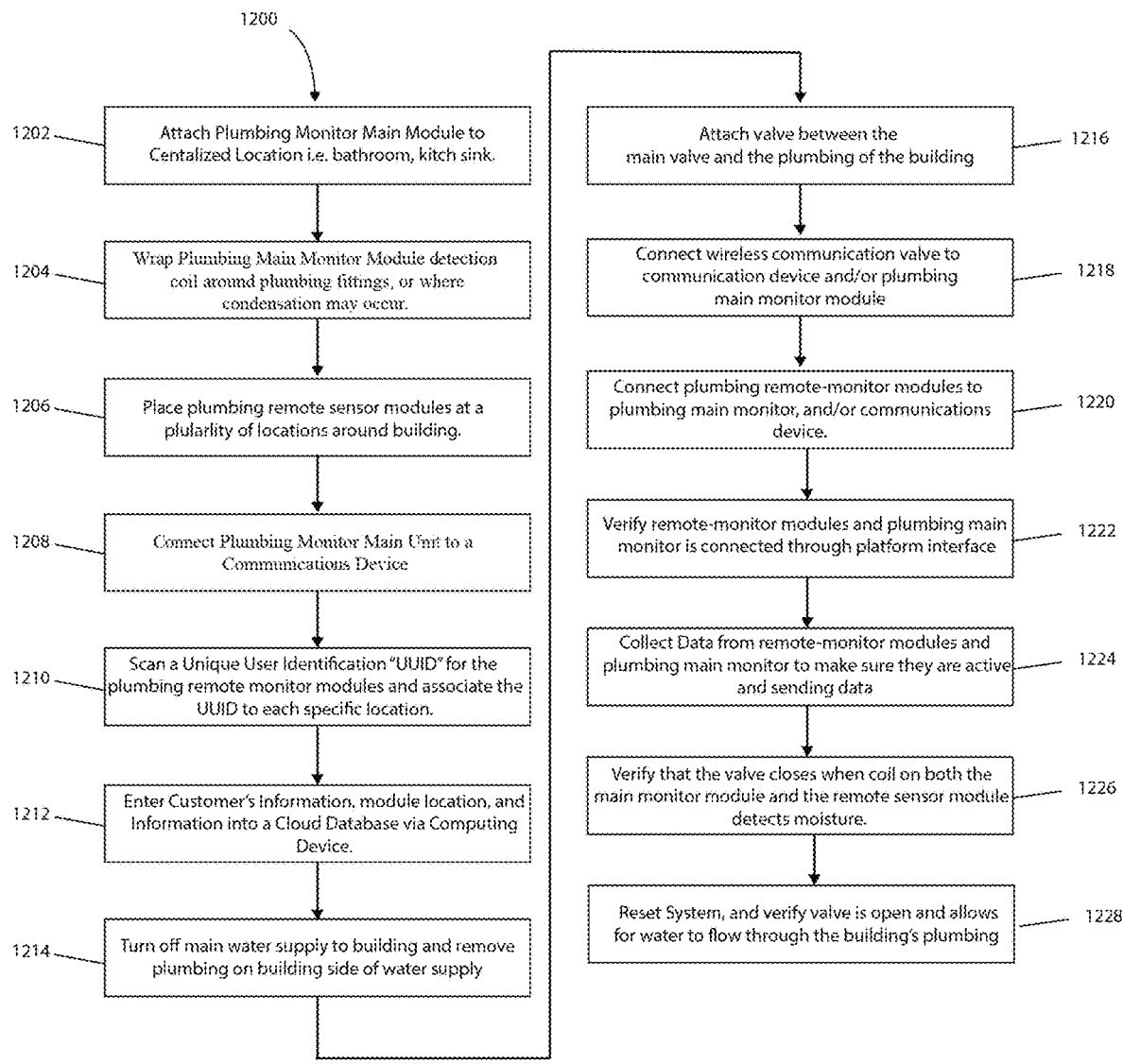
FIG. 13 illustrates a functional block diagram of wetness detection system installation process in accordance to one, or more embodiments.

Referring to FIG. 13, a functional block diagram of wetness monitor system installation process shown generally at 1200. At step 1202, attaching the wetness detector to a centralized location within the building for example, a bathroom, a kitchen sink, a hot water heater, or the like. At step 1204, the wetness detection coil 310 can be wrapped around the plumbing, the plumbing fittings, or placed beneath the plumbing where condensation may occur. At step 1206, the remote wetness detection module can be placed at a plurality of locations throughout the building as shown in FIG. 12, and connect the remote wetness detection modules to the main wetness detection system. At step 1208, the wetness monitor system can be connected remotely to a wireless communications device through a router (optional) to a cloud system which can relay information between the remote wetness detection modules, the main wetness detection system and the building owner. At step 1210, the plurality of remote wetness detection modules and main wetness detection system's unique user identification ("UUID") can be associated with each location that the remote wetness detection modules and the main wetness detection system are located.

At step 1212, the customer's information, module location, and information regarding the building can be inputted into the computing system database and uploaded to the cloud. The information can include, but is not limited to, the module's location within the building, the building's location, the number of modules throughout the house, the status of the device, or the like. At step 1214, the main water supply to the building can be turned off. The plumbing on the building side of the main water supply can be removed by cutting a section out of the piping. At step 1216, the shut off valve can be placed in the removed section by threading it on, sweating the pipe on with solder, or the like. At step 1218, the shut off valve can have a wireless communication device attached to it wherein the wireless communication device can be connected to the wetness detection system wherein the wireless communication device can transmit data to open or close the shut off valve, or determine at what state the shutoff valve is in. At step 1220, the remote wetness detection module can be connected to the wetness detection system, and then the wireless communication device can be connected to the cloud system which can relay information to the building owner.

At step 1222, the wetness monitor system and remote wetness detection modules can be verified by connecting to the building owner's wireless computing device, or computing device. An application on the wireless communication device can send and receive signals to and from the wetness detection system and remote wetness detection modules giving the building owner status of the devices. At step 1224, the data can be received and collected from the wetness detection system and remote wetness detection modules, and then data sent back to the modules to self-test or verify the system is connected and monitoring for wetness. At step 1226, the wetness monitor system and remote wetness detection modules can be tested and the shut off valve closed when moisture is detected, and the user can be notified when this occurs. At step 1228, the wetness monitor system and remote wetness detection modules can be reset, the shut off valve back open, and can allow water to flow through the building's plumbing freely.

Figure 14:
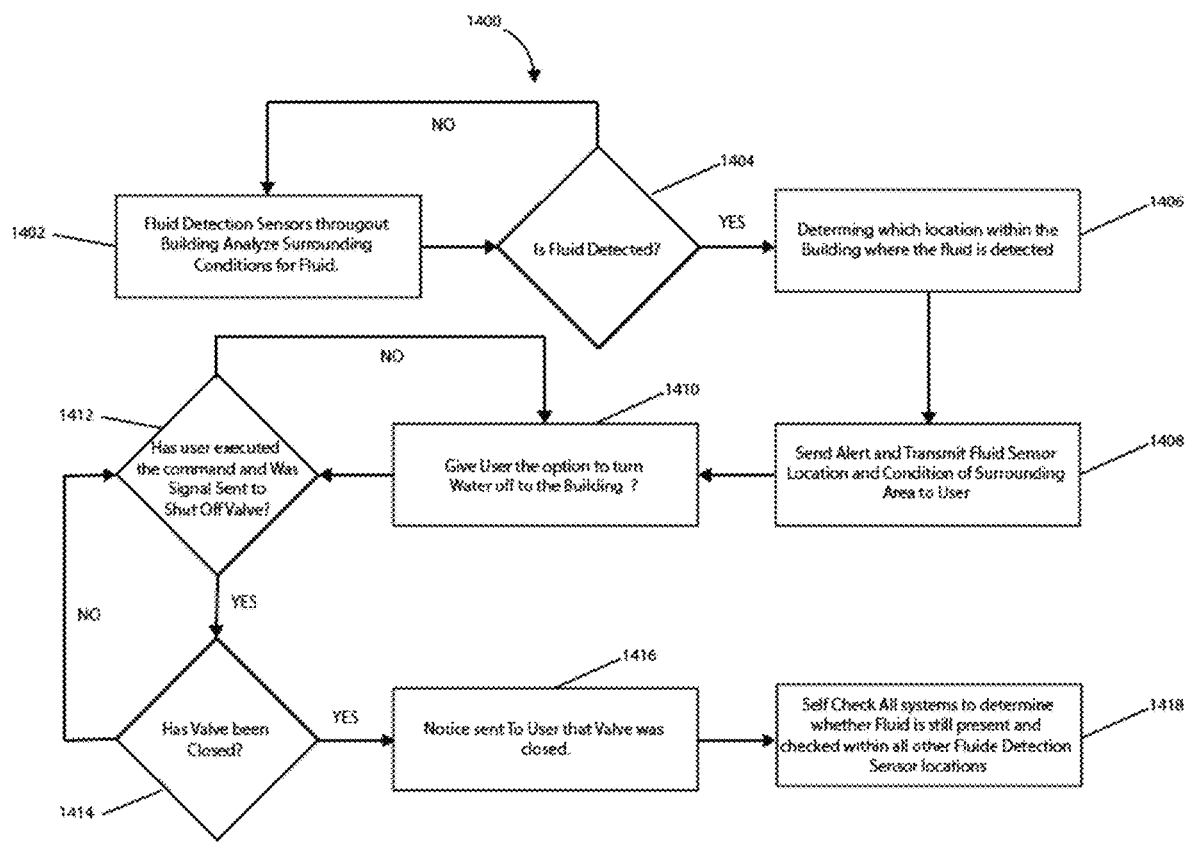
FIG. 14 illustrates a functional block diagram to analyze, detect, alert a user from a wetness monitoring system in accordance to one, or more embodiments.

Referring to FIG. 14, a flowchart depicts example operation for detecting wetness and transmitting alert to user is shown generally at 1400. A method such as described by an embodiment of FIG. 14 can be implemented by using, for example, components described with in embodiments of FIG. 9-11. The wetness detection sensors can be placed through a building so that they can analyze the surrounding conditions for wetness 1402, wherein the sensors can be placed in a plurality of locations either by a leak area or attached to the pipe. The wetness detection sensors (both wetness detection system and remote wetness detection modules) can periodically send a signal to the cloud system, and the user's computing device to ensure the devices are still alive and functioning, and the batteries can be self-test to determine the battery life within each sensor. The wetness detection system and remote wetness detection modules will periodically detect for wetness, and/or can turn on if wetness is detected. In the absence of wetness, the wetness detection system and remote wetness detection modules 1404 will infer that there is no wetness around the sensor and will continue to monitor for wetness. If wetness is detected 1406 then the system determines which location within the building the wetness is detected.

Once the location is determined that locations unique identification is sent along with the alert 1408 to the user and the in some embodiments the surrounding condition of the location can be sent to the user. If an alert is sent to a user then the user has the option to turn the building's main water supply off to the building 1410. The system then determines whether the user has executed the command and whether the signal was sent to the shutoff valve 1412, if such a request is received then the wetness detection system closes the valve, otherwise the user is sent an error with another command to turn off the wetness to the building. The wetness detection system checks 1414 if the valve has been closed, if not it checks whether the system sent the command, if it has closed then 1416 notice is sent to the user that the shutoff valve was closed. Control continues at 1418 where the location of the wetness is sent to the user, and then the wetness detection system self-checks all the wetness detection sensors to determine whether wetness is still present at all sensor locations.

Figure 15:
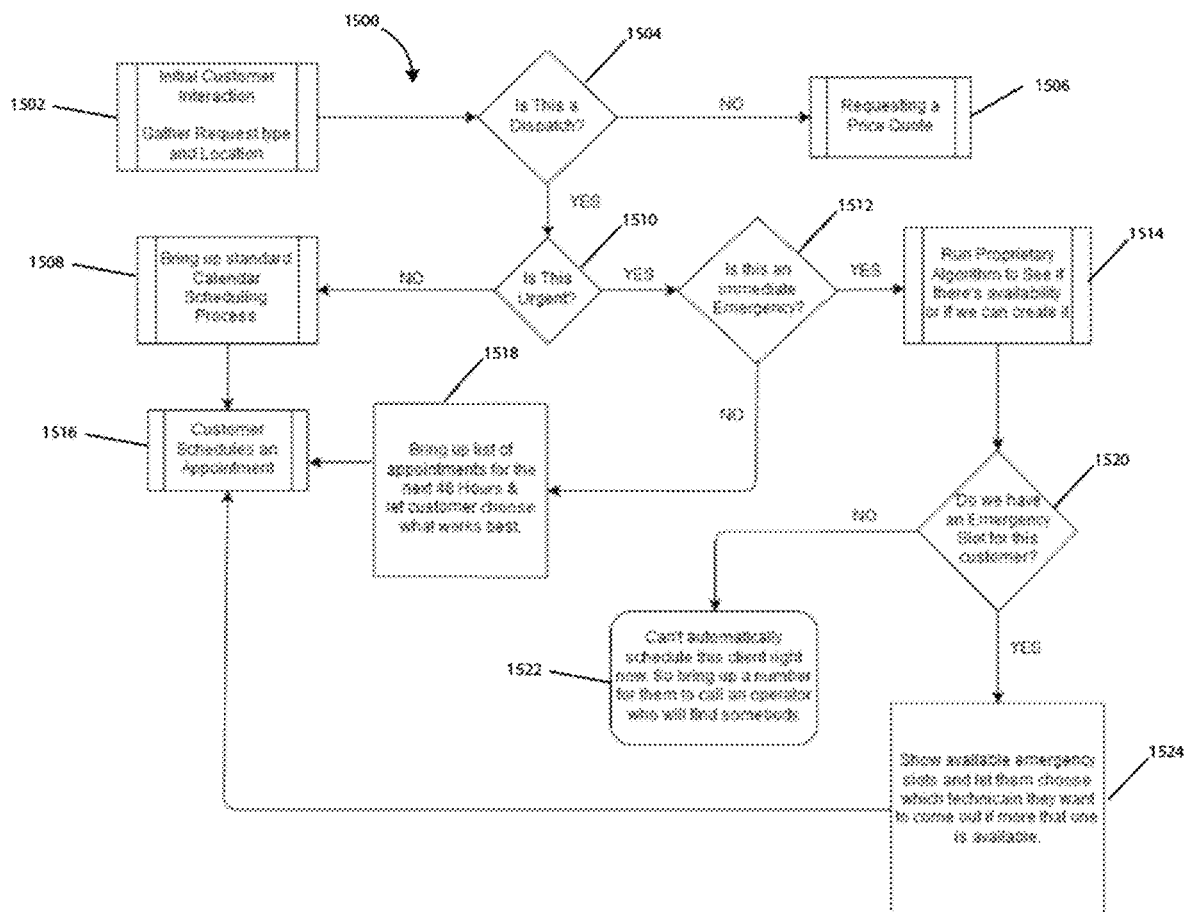
FIG. 15 illustrates a functional block diagram for a building monitoring system selecting a technician in accordance to one, or more embodiments.

Referring to FIG. 15, a flowchart depicts an example operation for is shown generally at 1500. A method such as described by an embodiment of FIG. 15 can be implemented by using, for example, components described with in embodiments of FIG. 1-4c. Control begins at step 1502 with the initial user interaction wherein the user's request type and location is collected and stored. The request type can be from the HVAC monitor, wetness detection system, or from any other home monitoring system within the building including, but not limited to, alarm system, door lock system, doorbell system, or the like. The user can be directed to a landing page wherein the landing page can have a drop-down menu with industry categories and actions under each category such as, for example, the user can choose AC repair, replace, or service. An alert is sent to the user and the monitoring system can determine 1504 whether the user is requesting a dispatch, emergency, set an appointment or request a pricing for a quote. If the user is requesting a price quote 1506 then the monitoring system logs the information and asks the user a series of questions regarding the service to provide an accurate quote. If the request is urgent 1510 then the monitoring system determines whether it is an immediate emergency or can be scheduled at a future date. If the request is urgent the user will have the option to enter their address or their address can be determined by geo-location, the monitoring system searches within an adjustable radius around their current location for service providers that have open appointments. If the request is not urgent then 1508 a calendar scheduling process is sent to the user to choose a date and time for the technician to perform the service. If the request is urgent 1512 then the monitoring system using a computing device can run an algorithm (step 1514) to see if there is technician availability in the area, or if there is an emergency slot (step 1520) available for the user to get immediate service. If there is not an emergency slot (step 1522) then monitoring system cannot automatically schedule this client right now, so bring up a number for them to call an operator who will find someone. Show available emergency slots (step 1524) and let them choose which technician they want to come out if more than one is available.

Figure 16:
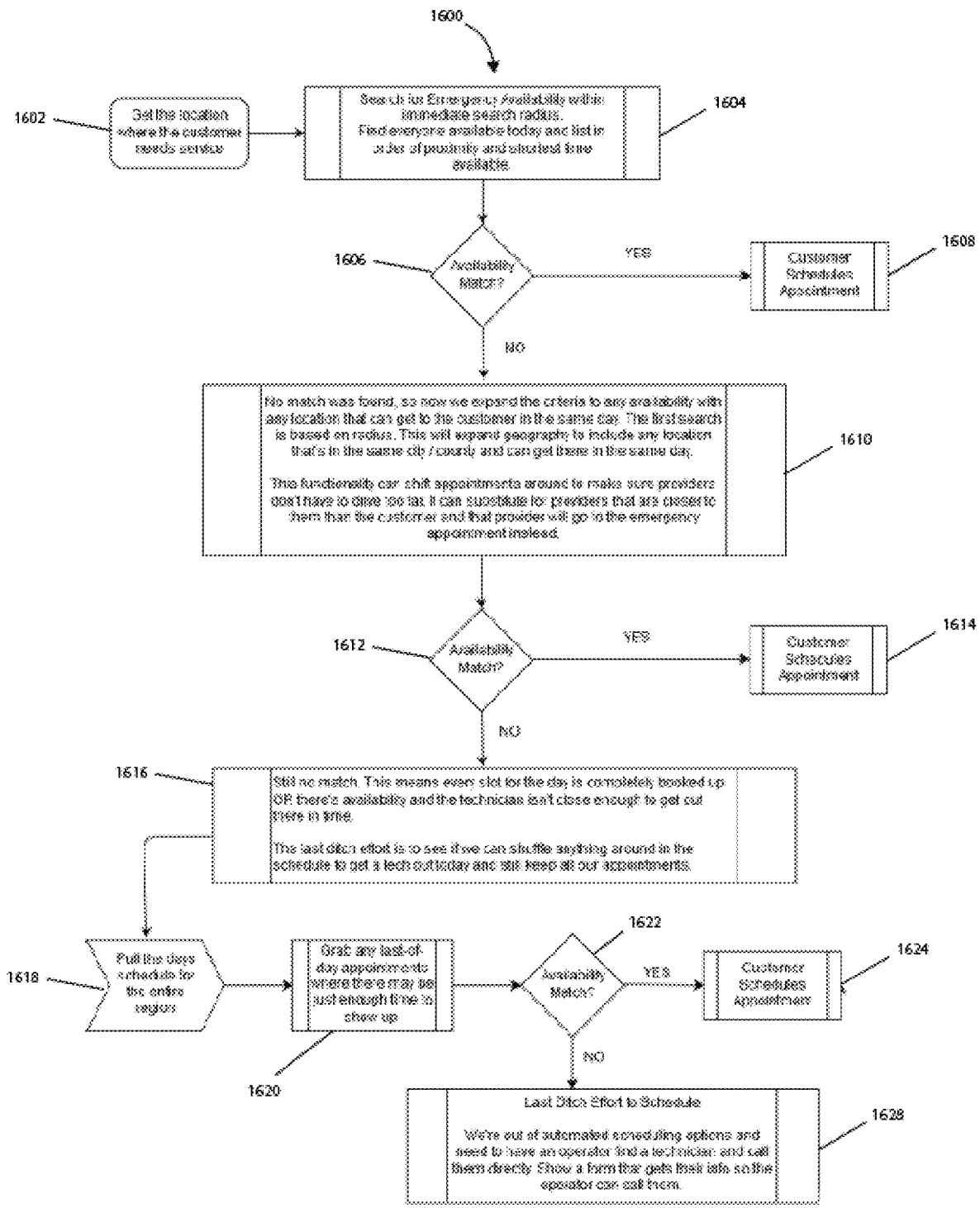
FIG. 16 illustrates a functional block diagram for a building monitoring system technician and user location services diagram in accordance to one, or more embodiments.

Referring to FIG. 16, a flowchart depicts example operation in capturing a user's information and sending alerts to the user shown generally at 1600. A method such as described by an embodiment of FIG. 16 can be implemented by using, for example, components described with in embodiments of FIG. 1-4c. The monitoring system gets the user's location where the user needs service 1602. If the needed service is an emergency, then the monitoring system searches for technicians available for an emergency service availability within the immediate search radius. 1604 Find the technician that is available today and list in order of proximity to the user's location and shortest time available. At 1606, the monitoring system determines whether there is a match and availability with a technician, and the user schedules the appointment 1608. If no match was found the search is expanded to any available technician within any location that can get to the customer, the same day. The first search is based on radius, which will expand geographic region to include any location that in the same city/county and can get there in the same day.

The 1610 functionality can shift appointments around to make sure service providers do not have to drive to far. It can substitute for service providers that are closer to them then the customer and that service provider will go to the emergency appoint instead. The monitoring system determines whether there is an available match 1612, if there is an available match then the customer schedule an appointment 1614. If 1616 there is still not a match and every slot for the day is completely booked or there is availability and the service provider is not close enough to get out there in time. If there is not a match then 1618 the days scheduled for the entire region are pulled, and 1620 then any last of day appointments where there may be just enough time to show up. The monitoring system then checks to see if there is availability 1622, if there is then the user schedules the appointment 1624, otherwise there is a last-ditch effort to schedule an appointment with the user, and a notification is sent to the user wherein the user can be notified that the automated scheduling options are no longer available and the user can have the service provider call them directly, and form is shown to collect all the user's information 1628.

Figure 17:
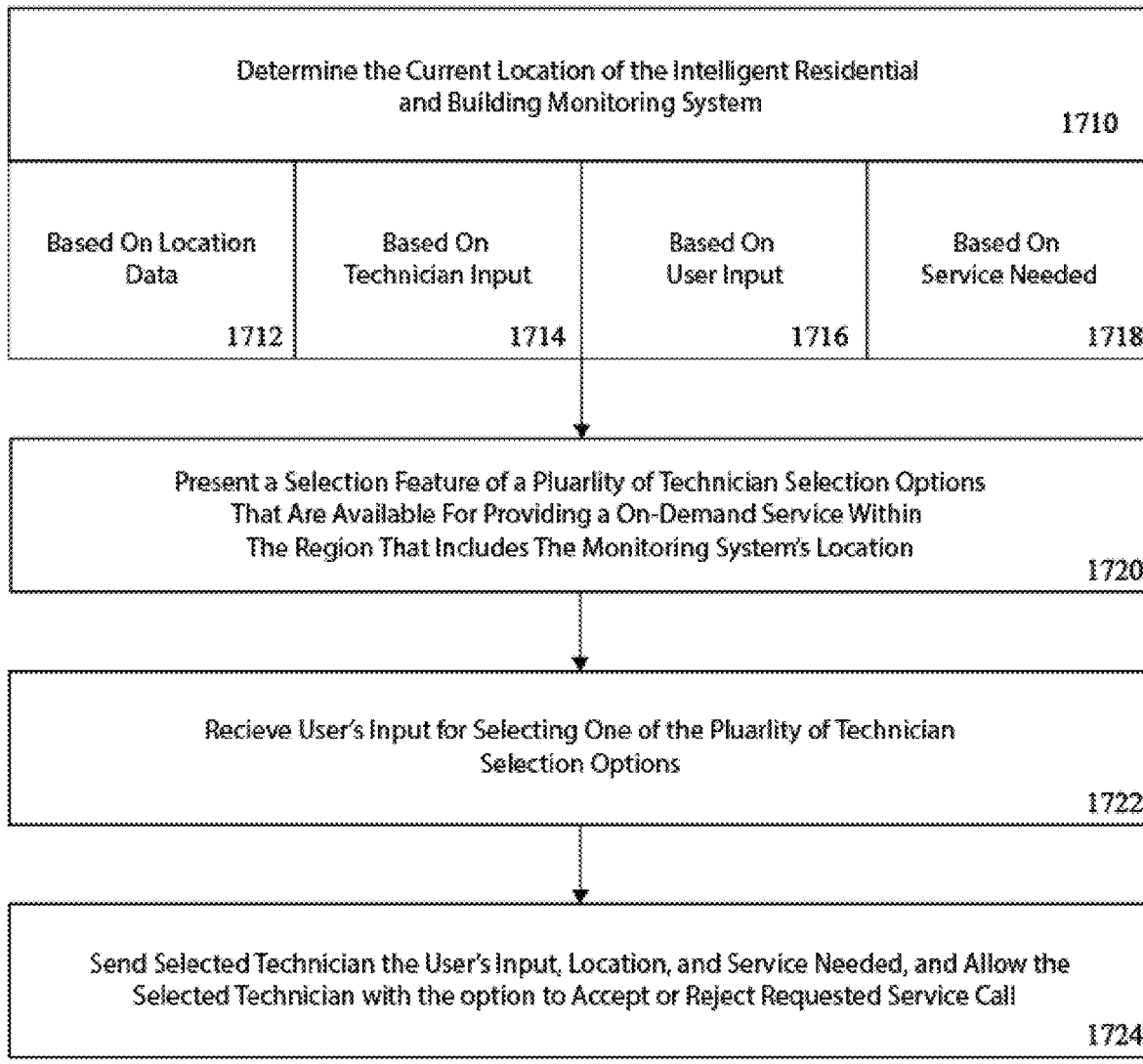
FIG. 17 shows a flow diagram for a building monitoring system in accordance to one, or more embodiments.

Referring to FIG. 17, illustrates an example method for providing on-demand monitoring service user interface features on a computing device, according to an embodiment. A method such as described by an embodiment of FIG. 17 can be implemented by using, for example, components described with in embodiments of FIG. 1-4c. The on-demand service application can automatically determine the location of the user and/or technician's computing device (step 1710) (or the selected service location for the on-demand service) can be determined based on geo-location data provided by the devices GPS component or IP address of the computing device (sub-step 1712), based on the technicians input (sub-step 1714), based on user input (sub-step 1716), and/or based on the service needed (sub-step 1718). Using the technicians or the user's current location, an area or region in which the on-demand monitoring services can identify the available service technicians (electricians, HVAC technicians) in the area that can perform the on-demand monitoring service.

Based on the determined area and/or region the determined current location or technician's location, a multistate selection feature for selecting one or more of a plurality of service options can be presented on a computing device's display such as, for example, HVAC service, plumbing service, HVAC repair, plumbing repair, or the like (step 1720). The multistate selection feature can identify and enable the user to select one of the various service options available for a particular on-demand service, such as, for example, the multistate selection feature can identify the specific type of service being requested by the user. The multistate selection feature can identify those services that are needed by the user or can show the services provided by the technician. The monitoring system can receive the user's input for selecting one of the plurality of technician selection options (step 1722). The user can interact with the multistate selection feature and the features can be displayed to the user by a selectable icon, drop down list, slider panel, or the like. In other embodiments, the multistate selection feature can be a toggle that can switch on and off the different available services that the user can choose from. For example, on a mobile computing device with a touch sensitive display, the user can tap on the option to move the toggle to the selected service option or can use the drop down menu to choose the service that needs to be completed. In another embodiment, the user can be provided the recommended service that needs to be performed on their HVAC or plumbing system. Once the user makes a selection from the services to be performed on the HVAC or plumbing system the application will display to the user the features that are region specific to their location, and the technicians that are in their general location. The monitoring system can send the selected technician the user's input, location, and service needed, and the selected technician can be given a menu or toggle to either accept or reject the requested service call (step 1724).

Figure 18:
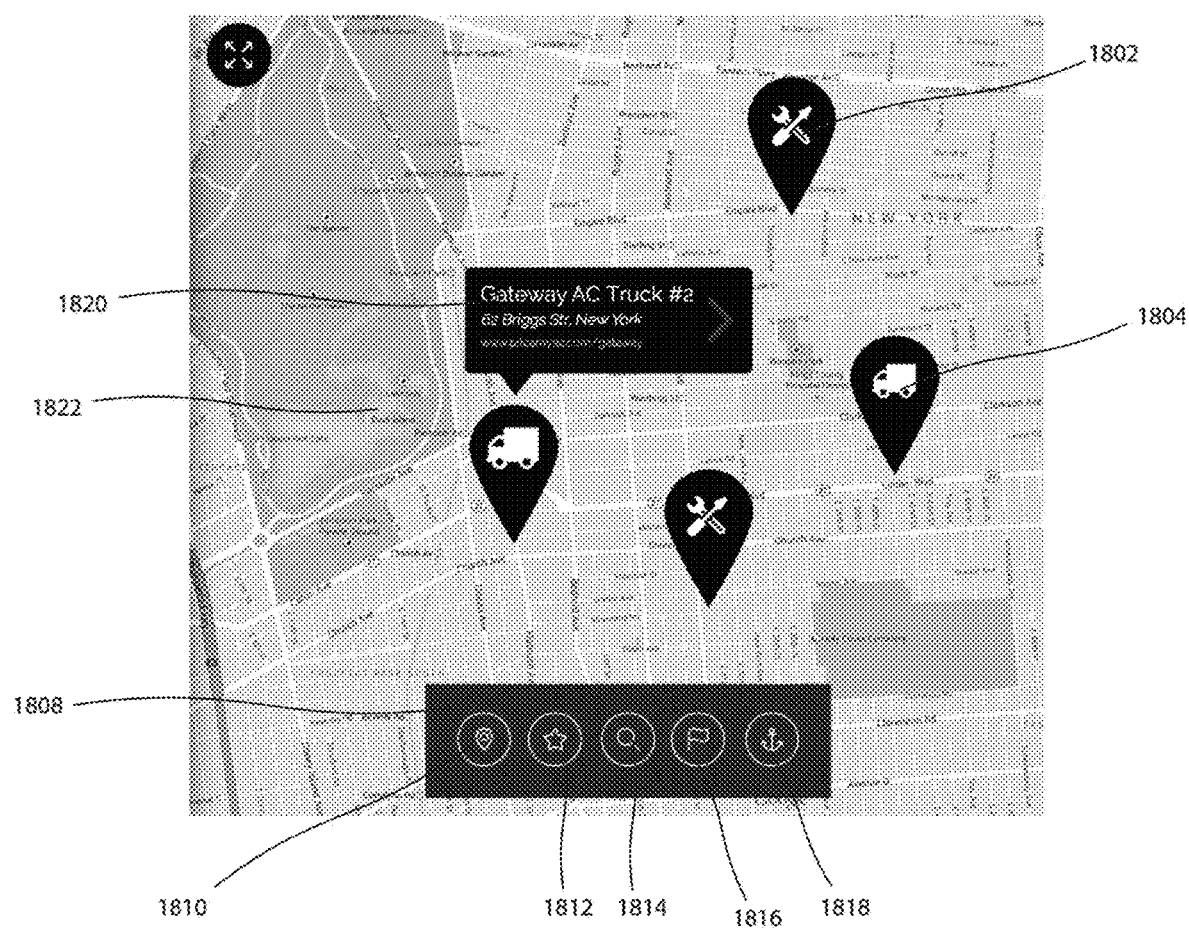
FIG. 18 shows a computing device sample app graphic for customers choosing a technician in the area for a building monitoring system cloud-based location service in accordance to one, or more embodiments.
Figure 19:
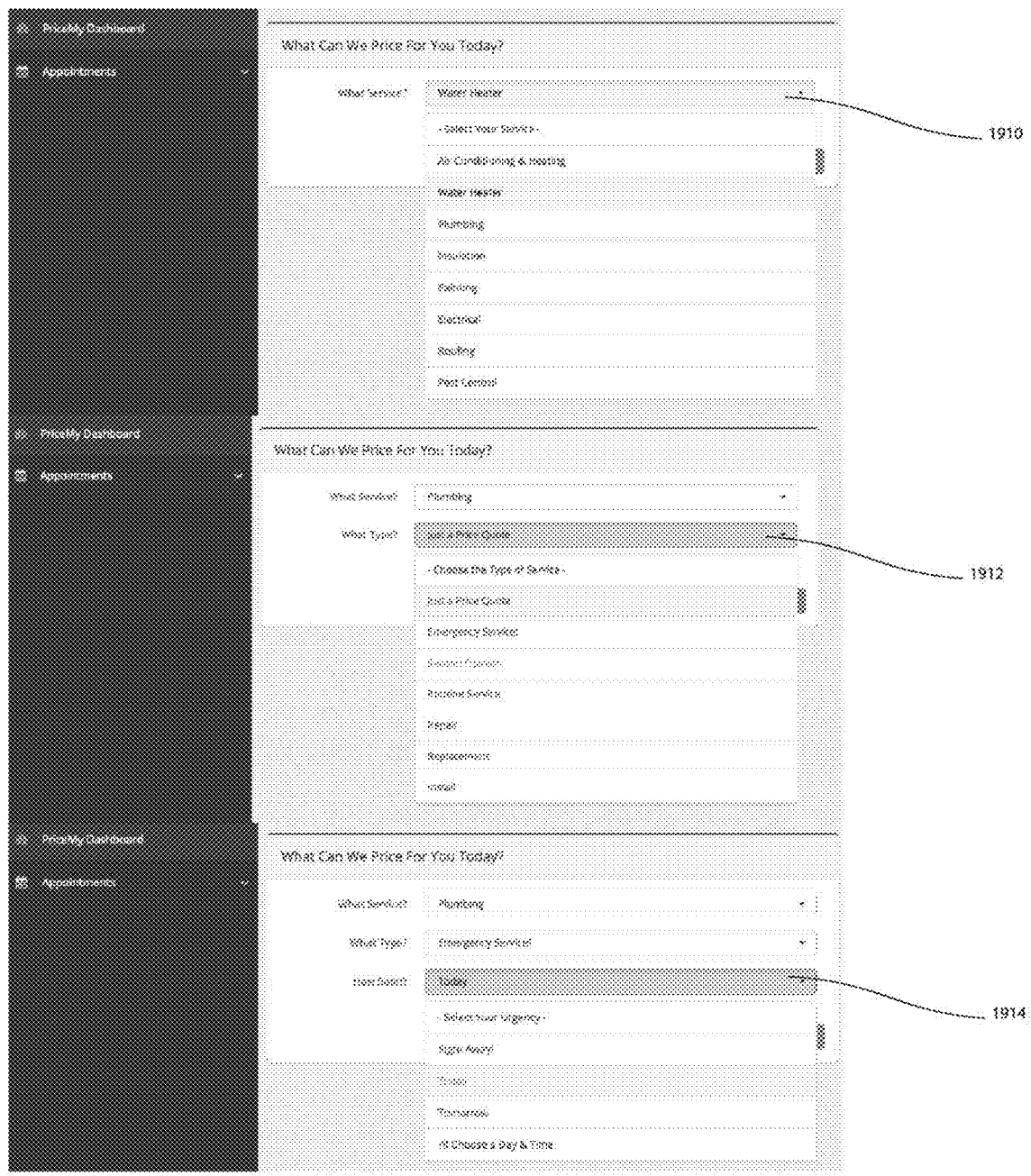
FIG. 19 illustrates a web-based diagram for a customer and technician portal for a building monitoring system cloud-based location service in accordance to one, or more embodiments.

Referring to FIGS. 18-19, which illustrate example user interfaces that are displayed to a user to enable the steward to request an on-demand service thought the use of a connector, according to an embodiment. When the user initiates and operates the technician on-demand service application on his or her computing device the user can interact with features on the home page of the user interface on both the mobile application or on the website. The user interface can show for example, the user's region 1802, different service options, technicians in the region, the type of technician in the area, and/or the urgency of the service. The user interface can have a summary panel 1808 wherein the summary panel can select the user region 1810 or approximate location 1802, the type of services needed 1812, the urgency of the service 1816, and technicians in the region or next to the user's region or location 1818. The summary panel 1808 can be provided concurrently with the multistate selection feature (as shown in FIG. 19), or all by itself. The summary panel 1818 can all the user to show where they are located geographically 1810 on a map 1822 and toggle their location on and off. The summary panel can provide the type of services 1812 the user may need on his or her building, or can schedule for future services wherein the type of services can provide a multistate selection feature (as shown in FIG. 19) with for example, the type of services 1910, what type 1912, and how soon 1914. For example, the user can choose between, but not limited to, air condition & heating, water heater, plumbing, insulation, painting, electrical, roofing, pest control, or the like. Once the user chooses one of those options then the user will be shown another multistate selection feature 1912 which will allow the user to choose from, but not limited to, just a price quote, emergency services, second opinion, routine service, repair, replacement, install, or the like. The user will then be able to choose how soon 1914 they need the service for example, right away, today, tomorrow, choose a day and time.

The user can see the technicians 1804 located in his or her area that specialize in the type of service 1812 selected. If there is not a technician that specializes in that particular area of service then the location can be expanded out to other areas. The map 1822 can show the technicians within the user's approximate location 1802, or the summary panel 1808 can toggle the technicians 1818 to only show the technicians that specialize in such as, for example, air condition & heating, water heater, plumbing, insulation, painting, electrical, roofing, pest control, or the like. The summary panel 1808 can allow the user to toggle to show the technicians that are available in the are based upon the urgency of the service 1816. For example, if the technician does not have any availability for an urgent service request then that technician will not be shown on the map, or the technician can be shown as busy until a certain day and/or time. The user can toggle between the type of request 1912 to show which technicians are available for immediate service calls, or available to schedule a quote, or future service call. The summary panel 1808 can provide the technicians based upon ratings, time, service type, location, and/or urgency. The user interface can include a service location identifier 1820 that can identify the location of the computing device or the buildings location that the user has specified. The service location identifier 1820 can allow the user to select his or her preference between an address or the computing device's location, or in some embodiments the user can search 1814 for a particular technician or building location to request services to another location from specified technician.

It is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only and is not intended to limit the scope of the present disclosure, which is defined solely by the claims. Accordingly, embodiments of the present disclosure are not limited to those precisely as shown and described.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the disclosure are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

What is claimed is:

1. A monitor system for use with an existing HVAC unit, wherein the HVAC unit has a condenser or furnace, an air handler, and a thermostat, the HVAC monitor system comprising:
- at least one condenser or furnace sensor, at least one air handler sensor and at least one control module connected to the sensors and the thermostat, wherein the at least one control module comprises a processor and wherein the processor detects the existence of a fault based on information from the sensors; and
- a transceiver to relay information from the at least one control module to a network, wherein the network can communicate a fault notification to a user;
- a bypass that allows the HVAC unit to bypass the monitor system to maintain operation of the HVAC unit in the event of failure of the monitor system.

2. The monitor system of claim 1, wherein the at least one control module comprises a monitoring center module, a condensing module, and an air handler module wherein the monitoring center module has at least one connection point to connect the condensing module and air handler module to the at least one control module.

3. The monitor system of claim 1, wherein the condenser or furnace, the air handler and the thermostat have terminals and wherein the bypass comprises at least one relay that couples to the condenser or furnace terminals, the air handler terminals, and the thermostat terminals.

4. The monitor system of claim 1, wherein the HVAC unit comprises a fault detection system, and an LED pulse that communicates a detected fault to a user, wherein the monitor system further comprises a LED code reader sensor that reads the LED pulse wherein the LED code reader sensor is a photodiode sensor.

5. The monitor system of claim 1 wherein the condenser or furnace sensor is selected from at least one of a fault circuit, a main current transducer, a fan motor current transducer, and a compressor current transducer and wherein the air handler sensor is selected from at least one of return air temperature sensor, supply air temperature sensor, fluid detector, motor current transducer and a flow meter.

* * * * *